(12) United States Patent
Lin et al.

(10) Patent No.: US 11,262,554 B2
(45) Date of Patent: Mar. 1, 2022

(54) LENS SYSTEM, IMAGE CAPTURING UNIT AND ELECTRONIC DEVICE

(71) Applicant: LARGAN PRECISION CO., LTD., Taichung (TW)

(72) Inventors: Cheng-Chen Lin, Taichung (TW); Po-Lun Hsu, Taichung (TW); Wei-Yu Chen, Taichung (TW)

(73) Assignee: LARGAN PRECISION CO., LTD., Taichung (TW)

(*) Notice: Subject to any disclaimer, the term of this patent is extended or adjusted under 35 U.S.C. 154(b) by 0 days.

(21) Appl. No.: 16/882,467

(22) Filed: May 23, 2020

(65) Prior Publication Data

US 2020/0285031 A1   Sep. 10, 2020

Related U.S. Application Data

(63) Continuation of application No. 15/955,114, filed on Apr. 17, 2018, now Pat. No. 10,705,320, which is a
(Continued)

(30) Foreign Application Priority Data

Feb. 26, 2015 (TW) ................. 104106261

(51) Int. Cl.
 *G02B 13/00* (2006.01)
 *G02B 9/62* (2006.01)
 (Continued)

(52) U.S. Cl.
 CPC ........... *G02B 13/0045* (2013.01); *G02B 9/62* (2013.01); *G02B 13/06* (2013.01); *G02B 5/005* (2013.01);
 (Continued)

(58) Field of Classification Search
 CPC .... G02B 13/0045; G02B 13/06; G02B 13/04; G02B 13/005; G02B 9/62
 (Continued)

(56) References Cited

U.S. PATENT DOCUMENTS 9,057,865 B1 * 6/2015 Hsu .................. G02B 9/62
9,104,009 B2 * 8/2015 Bone ................ G02B 13/0015
(Continued)

FOREIGN PATENT DOCUMENTS

CN    103488039 A   1/2014
CN    104345431 A   2/2015

OTHER PUBLICATIONS

Lohmann, Adolf W. "Scaling Laws for Lens Systems." Applied Optics, vol. 28, No. 23, Dec. 1, 1989, pp. 4996-4998. (Year: 1989).*

*Primary Examiner* — Zachary W Wilkes
(74) *Attorney, Agent, or Firm* — Maschoff Brennan

(57) ABSTRACT

A lens system includes, in order from an object side to an image side, a first lens element, a second lens element, a third lens element, a fourth lens element, a fifth lens element and a sixth lens element. The first lens element with negative refractive power has a concave image-side surface in a paraxial region. The second lens element with refractive power has a convex object-side surface in a paraxial region. The third lens element has positive refractive power. The fourth lens element with positive refractive power has an object-side and an image-side surfaces being aspheric. The fifth lens element with negative refractive power has an aspheric concave object-side surface and an aspheric convex image-side surface in a paraxial region. The sixth lens element with refractive power has an image-side surface being concave in a paraxial region with a convex shape in an off-axis region.

24 Claims, 18 Drawing Sheets

Related U.S. Application Data continuation of application No. 15/447,085, filed on Mar. 1, 2017, now Pat. No. 10,007,095, which is a continuation of application No. 14/740,026, filed on Jun. 15, 2015, now Pat. No. 9,606,327.

(51) Int. Cl.
| | | |
|---|---|---|
| *G02B 13/06* | (2006.01) | |
| *G02B 27/00* | (2006.01) | |
| *G02B 5/00* | (2006.01) | |
| *G02B 13/04* | (2006.01) | |
| *G02B 13/18* | (2006.01) | |

(52) U.S. Cl.
CPC ........ *G02B 13/002* (2013.01); *G02B 13/0015* (2013.01); *G02B 13/04* (2013.01); *G02B 13/18* (2013.01); *G02B 27/0025* (2013.01)

(58) Field of Classification Search
USPC .................................................. 359/761, 762
See application file for complete search history.

(56) References Cited

U.S. PATENT DOCUMENTS

| | | | | |
|---|---|---|---|---|
| 9,411,132 | B2* | 8/2016 | Tang | G02B 13/0045 |
| 9,413,934 | B2* | 8/2016 | Tang | H04N 5/2252 |
| 9,606,326 | B2* | 3/2017 | Tang | G02B 13/0045 |
| 9,638,889 | B2* | 5/2017 | Shih | G02B 13/0045 |
| 9,709,773 | B2* | 7/2017 | Tang | G02B 13/0045 |
| 10,422,982 | B2* | 9/2019 | Lee | G02B 13/06 |
| 2010/0328471 | A1* | 12/2010 | Boland | G03B 37/04 348/207.99 |
| 2015/0116572 | A1* | 4/2015 | Liao | H04N 5/2254 348/340 |
| 2015/0346459 | A1* | 12/2015 | Chen | G02B 13/0045 348/335 |
| 2016/0131872 | A1* | 5/2016 | Tang | G02B 13/0045 359/713 |
| 2016/0131873 | A1* | 5/2016 | Tang | G02B 13/0045 359/713 |

\* cited by examiner

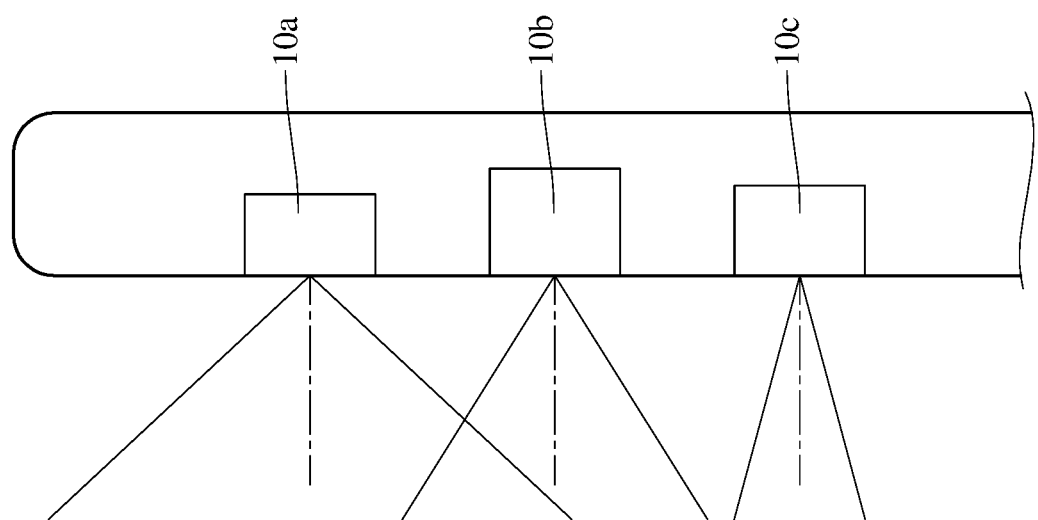

LENS SYSTEM, IMAGE CAPTURING UNIT AND ELECTRONIC DEVICE

RELATED APPLICATIONS

This application is a continuation patent application of U.S. application Ser. No. 15/955,114, filed on Apr. 17, 2018, which is a continuation patent application of U.S. application Ser. No. 15/447,085, filed on Mar. 1, 2017, which is a continuation patent application of U.S. Pat. No. 9,606,327 B2, filed on Jun. 15, 2015, which claims priority to Taiwan Application 104106261, filed on Feb. 26, 2015, which is incorporated by reference herein in its entirety.

BACKGROUND

Technical Field

The present disclosure relates to a lens system, an image capturing unit and an electronic device, more particularly to a lens system and an image capturing unit applicable to an electronic device.

Description of Related Art

In recent years, with the popularity of electronic devices having camera functionalities, the demand of miniaturized optical systems has been increasing. The sensor of a conventional optical system is typically a CCD (Charge-Coupled Device) or a CMOS (Complementary Metal-Oxide-Semiconductor) sensor. As the advanced semiconductor manufacturing technologies have allowed the pixel size of sensors to be reduced and compact optical systems have gradually evolved toward the field of higher megapixels, there is an increasing demand for compact optical systems featuring better image quality.

A conventional optical system employed in a portable electronic product mainly adopts a five-element lens structure. Due to the popularity of mobile terminals with high-end specifications, such as smart phones, tablet personal computers and wearable apparatuses, the requirements for high resolution and image quality of present compact optical systems increase significantly. However, the conventional optical systems cannot satisfy these requirements of the compact optical systems.

Other conventional compact optical systems with six-element lens structure having a large aperture are developed to enhance resolution and image quality. However, the optical systems are unfavorable for satisfying the requirements of large field of view and compact size simultaneously so that it is unfavorable for equipping the optical systems on a compact electronic device.

SUMMARY

According to one aspect of the present disclosure, a lens system includes, in order from an object side to an image side, a first lens element, a second lens element, a third lens element, a fourth lens element, a fifth lens element, and a sixth lens element. The first lens element with negative refractive power has an image-side surface being concave in a paraxial region thereof. The second lens element with refractive power has an object-side surface being convex in a paraxial region thereof. The third lens element has positive refractive power. The fourth lens element has positive refractive power, wherein an object-side surface and an image-side surface of the fourth lens element are both aspheric. The fifth lens element with negative refractive power has an object-side surface being concave in a paraxial region thereof and an image-side surface being convex in a paraxial region thereof, wherein the object-side surface and the image-side surface of the fifth lens element are both aspheric. The sixth lens element with refractive power has an image-side surface being concave in a paraxial region thereof, wherein the image-side surface of the sixth lens element has at least one convex shape in an off-axis region thereof, and an object-side surface and the image-side surface of the sixth lens element are both aspheric. The lens system has a total of six lens elements with refractive power. There is an air gap in a paraxial region between every two of the first lens element, the second lens element, the third lens element, the fourth lens element, the fifth lens element and the sixth lens element that are adjacent to each other. At least three of the first lens element, the second lens element, the third lens element, the fourth lens element, the fifth lens element and the sixth lens element are made of plastic material. When a focal length of the lens system is f, a focal length of the first lens element is f1, a focal length of the second lens element is f2, a focal length of the third lens element is f3, a focal length of the fourth lens element is f4, the following conditions are satisfied:

$$|f1/f2|<1.20; \text{ and}$$

$$0.80<(f/f3)+(f/f4).$$

According to another aspect of the present disclosure, an image capturing unit includes the aforementioned lens system and an image sensor, wherein the image sensor is disposed on the image side of the lens system.

According to still another aspect of the present disclosure, an electronic device includes a plurality of image capturing units. Each of the image capturing units comprises a lens system and an image sensor. The image sensor is disposed on an image side of the lens system. The lens systems are single focus lens systems. The lens systems have different fields of view. At least one of the lens systems is the lens system according to the aforementioned lens system.

According to yet another aspect of the present disclosure, a lens system includes, in order from an object side to an image side, a first lens element, a second lens element, a third lens element, a fourth lens element, a fifth lens element, and a sixth lens element. The first lens element with negative refractive power has an image-side surface being concave in a paraxial region thereof. The second lens element has refractive power. The third lens element has positive refractive power. The fourth lens element has positive refractive power. The fifth lens element with negative refractive power has an object-side surface being concave in a paraxial region thereof and an image-side surface being convex in a paraxial region thereof, wherein the object-side surface and the image-side surface of the fifth lens element are both aspheric. The sixth lens element with refractive power has an image-side surface being concave in a paraxial region thereof, wherein the image-side surface of the sixth lens element has at least one convex shape in an off-axis region thereof, and an object-side surface and the image-side surface of the sixth lens element are both aspheric. The lens system has a total of six lens elements with refractive power. There is an air gap in a paraxial region between every two of the first lens element, the second lens element, the third lens element, the fourth lens element, the fifth lens element and the sixth lens element that are adjacent to each other. At least three of the first lens element, the second lens element, the third lens element, the fourth lens element, the fifth lens element and the sixth lens element are made of plastic material. When a focal length of the lens system is f, a focal length of the first lens element is f1, a focal length of the second lens element is f2, a focal length of the third lens element is f3, a focal length of the fourth lens element is f4, and the following conditions are satisfied:

$|f1/f2|<1.20;$ $1.60<(f/f3)+(f/f4);$ and $0<f3/f4<3.0.$

According to yet another aspect of the present disclosure, a lens system includes, in order from an object side to an image side, a first lens element, a second lens element, a third lens element, a fourth lens element, a fifth lens element, and a sixth lens element. The first lens element has negative refractive power. The second lens element has refractive power. The third lens element has refractive power. The fourth lens element has refractive power. The fifth lens element has refractive power, wherein an object-side surface and an image-side surface of the fifth lens element are both aspheric. The sixth lens element has refractive power, wherein an image-side surface of the sixth lens element has at least one inflection point in an off-axis region thereof, and an object-side surface and the image-side surface of the sixth lens element are both aspheric. The lens system has a total of six lens elements with refractive power. When an axial distance between an object-side surface of the first lens element and an image surface is TL, half of a maximal field of view of the lens system is HFOV, a maximum effective radius of the object-side surface of the first lens element is SD11, a maximum effective radius of the image-side surface of the sixth lens element is SD62, a maximum image height of the lens system is ImgH, the following conditions are satisfied:

$TL/\sin(HFOV*1.6)<7.0$ mm;

$1.30<\tan(HFOV);$ $|SD11/SD62|<2.40;$ and $TL/ImgH<2.50.$

According to yet another aspect of the present disclosure, an electronic device comprises a first image capturing unit, a second image capturing unit and a third image capturing unit. The first image capturing unit comprises a first lens system and an image sensor. The image sensor is disposed on an image side of the first lens system. The first lens system comprises an object-side lens element being the closest lens element to an imaged object among all lens elements of the first lens system with refractive power. The second image capturing unit comprises a second lens system. The third image capturing unit comprises a third lens system. The first image capturing unit, the second image capturing unit, and the third image capturing unit have different fields of view from one another. The first lens system, the second lens system and the third lens system are all single focus lens systems. When half of a maximal field of view of the first lens system is HFOV, an axial distance between an object-side surface of the object-side lens element and an image surface is TL, a maximum image height of the first lens system is ImgH, and the following conditions are satisfied:

$TL/\sin(HFOV*1.6)<10.0$ mm;

$0.70<\tan(HFOV);$ and $TL/ImgH<3.0.$

BRIEF DESCRIPTION OF THE DRAWINGS

The disclosure can be more fully understood by reading the following detailed description of the embodiments, with reference made to the accompanying drawings as follows:

FIG. 17 is shows a side view of the electronic device in FIG. 16;

DETAILED DESCRIPTION

Figure 1:
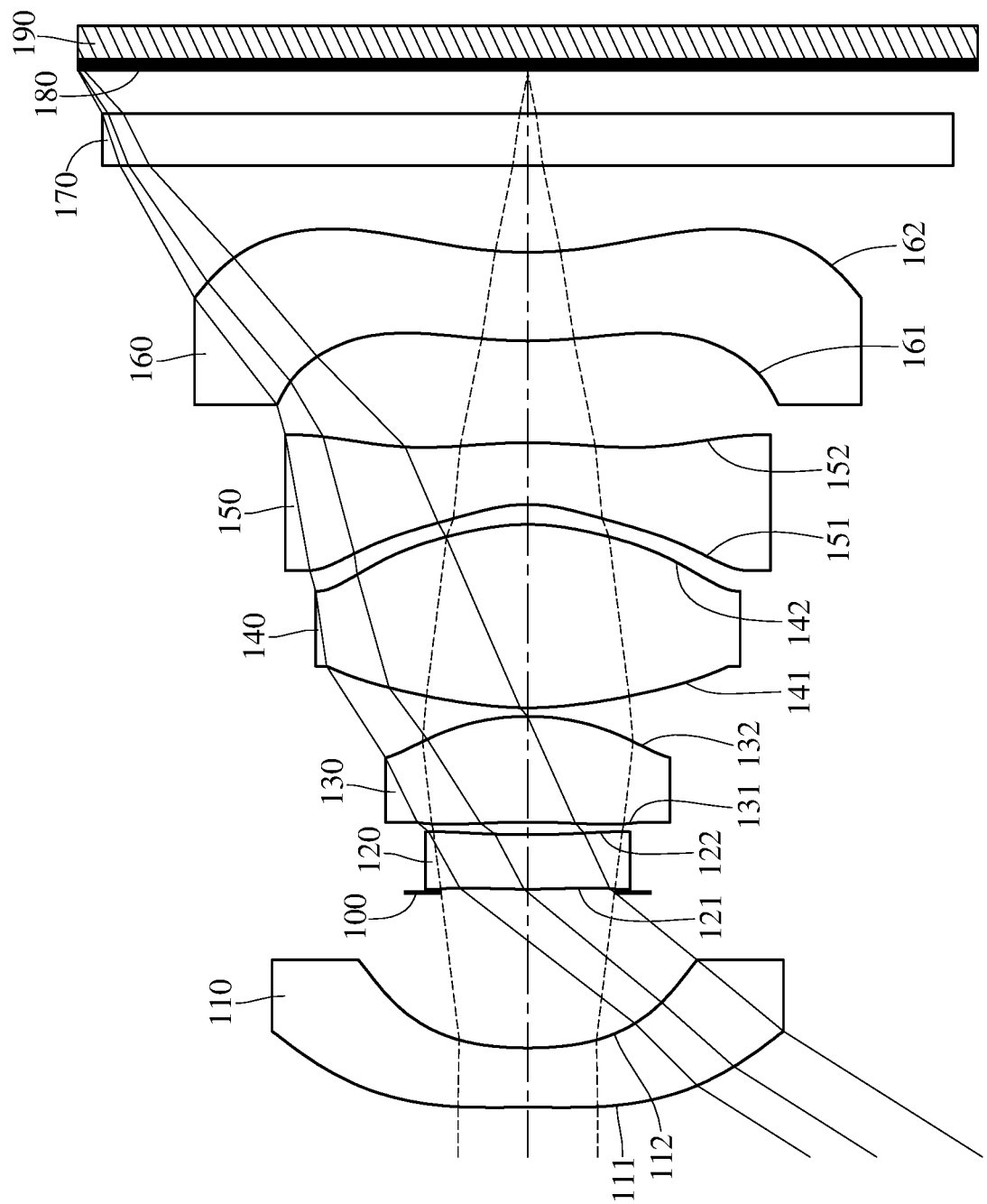
FIG. 1 is a schematic view of an image capturing unit according to the 1st embodiment of the present disclosure.

A lens system includes, in order from an object side to an image side, a first lens element, a second lens element, a third lens element, a fourth lens element, a fifth lens element and a sixth lens element. The lens system can have a total of six lens elements with refractive power.

According to the lens system of the present disclosure, in some embodiments, there is an air gap in a paraxial region arranged between every two of the first lens element, the second lens element, the third lens element, the fourth lens element, the fifth lens element, and the sixth lens element that are adjacent to each other, that is, each of the first through sixth lens elements of the lens system can be a single and non-cemented lens element. Moreover, the manufacturing process of the cemented lenses is more complex than the non-cemented lenses. In particular, an image-side surface of one lens element and an object-side surface of the following lens element need to have accurate curvature to ensure these two lens elements will be highly cemented. However, during the cementing process, those two lens elements might not be highly cemented due to displacement and it is thereby not favorable for the image quality of the lens system. Therefore, there is an air gap in a paraxial region between every two of the first lens element, the second lens element, the third lens element, the fourth lens element, the fifth lens element and the sixth lens element that are adjacent to each other in the present disclosure for solving the problem generated by the cemented lens elements. Furthermore, in some embodiments, the first lens element, the second lens element, the third lens element, the fourth lens element, the fifth lens element and the sixth lens element are all stationary relative to each other in a paraxial region thereof, so that it is favorable for the lens system being a single focus lens system.

The first lens element can have negative refractive power. The first lens element can have an image-side surface being concave in a paraxial region thereof. Therefore, it is favorable for enlarging a field of view of the lens system so as to capture a large image.

The second lens element with refractive power can have an object-side surface being convex in a paraxial region thereof. Therefore, it is favorable for correcting the aberration from the first lens element so as to improve the image quality. Furthermore, it is favorable for reducing a total track length of the lens system.

The third lens element can have positive refractive power. The third lens element can have an image-side surface being convex in a paraxial region thereof. Therefore, the first lens element and the third lens element are favorable for balancing the arrangement of the refractive power of the lens system so as to reduce the sensitivity of the lens system.

The fourth lens element can have positive refractive power. The fourth lens element can have an image-side surface being convex in a paraxial region thereof. Therefore, it is favorable for correcting the Petzval's sum of the lens system so as to improve the flatness of the image surface and reduce the astigmatism of lens system.

The fifth lens element can have negative refractive power. The fifth lens element can have an object-side surface being concave in a paraxial region thereof and an image-side surface being convex in a paraxial region thereof. The image-side surface of the fifth lens element can have at least one concave shape in an off-axis region thereof. Therefore, it is favorable for correcting the spherical aberration of the lens system and the aberration of the off-axis region.

The sixth lens element can have positive refractive power. The sixth lens element can have an image-side surface being concave in a paraxial region thereof. The image-side surface of the sixth lens element can have at least one convex shape in an off-axis region thereof. The image-side surface of the sixth lens element can have at least one inflection point in an off-axis region thereof. Therefore, it is favorable for the principal point of the lens system being further positioned away from the image side of the lens system so as to reduce the total track length of the lens system. Furthermore, it is favorable for improving the image-sensing efficiency of the image sensor and further correcting the aberration of the off-axis region by effectively reducing the incident angle of the light projecting onto the image sensor.

When a focal length of the first lens element is f1, a focal length of the second lens element is f2, the following condition is satisfied: |f1/f2|<1.20. Therefore, it is favorable for preventing the refractive power of the second lens element from becoming too large. Furthermore, it is favorable for reducing the incident angle of the light so as to avoid excessive aberration.

When a focal length of the lens system is f, a focal length of the third lens element is f3, a focal length of the fourth lens element is f4, the following condition is satisfied: 0.80<(f/f3)+(f/f4). Therefore, it is favorable for assembling the lens elements with stronger refractive power at proper positions so as to prevent the manufacturing tolerance of the lens elements from influencing the manufacturing yield rate. Preferably, the following condition is satisfied: 1.60<(f/f3)+(f/f4). More preferably, the following condition is satisfied: 1.20<(f/f3)+(f/f4)<2.50.

When the focal length of the third lens element is f3, the focal length of the fourth lens element is f4, the following condition is satisfied: 0<f3/f4<3.0. Therefore, the refractive powers of the third lens element and the fourth lens element are properly distributed so that it is favorable for correcting the aberration of the lens system and reducing the sensitivity of the lens system.

When an axial distance between an object-side surface of the first lens element and an image surface is TL, half of a maximal field of view of the lens system is HFOV, the following condition is satisfied: TL/sin(HFOV*1.6)<10 mm. Therefore, it is favorable for keeping the lens system compact and providing the lens system with sufficient field of view. Preferably, the following condition is satisfied: TL/sin(HFOV*1.6)<7.0 mm.

When half of the maximal field of view of the lens system is HFOV, the following condition is satisfied: 1.30<tan(HFOV). Therefore, it is favorable for providing the lens system with a sufficient field of view as the lens system needs to be so as to avoid image distortion. Preferably, the following condition is satisfied: 0.70<tan(HFOV).

Figure 15:
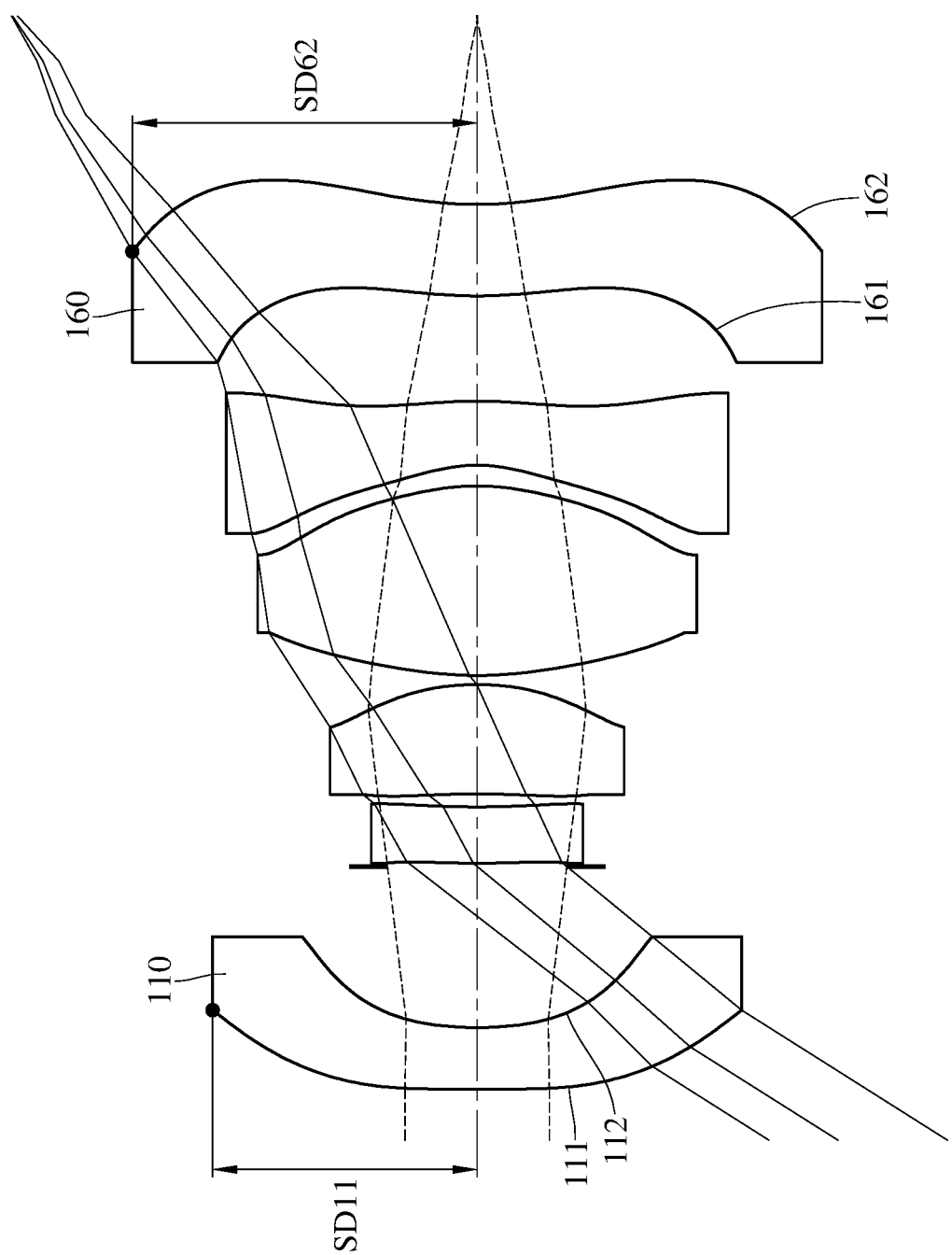
FIG. 15 is a schematic view of a maximum effective radius of an object-side surface of a first lens element and a maximum effective radius of an image-side surface of a sixth lens element in FIG. 1.

When a maximum effective radius of the object-side surface of the first lens element is SD11, a maximum effective radius of the image-side surface of the sixth lens element is SD62, the following condition is satisfied: |SD11/SD62|<2.40. Therefore, it is favorable for reducing the difference between a diameter of the first lens element and a diameter of the sixth lens element so that it is favorable for conveniently assembling the lens elements with a stable yield rate. Preferably, the following condition is satisfied: |SD11/SD62|<1.25. As seen in FIG. 15, which is a schematic view of a maximum effective radius of an object-side surface of a first lens element and a maximum effective radius of an image-side surface of a sixth lens element in FIG. 1.

When the axial distance between the object-side surface of the first lens element and the image surface is TL, a maximum image height of the lens system (half of a diagonal length of an effective photosensitive area of an image sensor) is ImgH, the following condition is satisfied: TL/ImgH<3.0. Therefore, it is favorable for keeping the lens system compact so as to be equipped in a compact electronic device. Preferably, the following condition is satisfied: TL/ImgH<2.50.

When a maximum effective radius of an object-side surface of an object-side lens element is SDfs, a maximum effective radius of an image-side surface of an image-side lens element is SDIs, the following condition can be satisfied: |SDfs/SDIs|<1.25. Therefore, it is favorable for reducing the difference between a diameter of the object-side lens element and a diameter of the image-side lens element so that it is favorable for conveniently assembling the lens elements with a stable yield rate. According to the present disclosure, the object-side lens element is the closest lens element to an imaged object among all lens elements of the lens system with refractive power, and the image-side lens element is the closest lens element to the image surface among all lens elements of the lens system with refractive power. For example, when the lens system includes a total of six lens elements with refractive power which are, in order from the object side to the image side, the first lens element, the second lens element, the third lens element, the fourth lens element, the fifth lens element and the sixth lens element, the aforementioned object-side lens element is the first lens element, and the aforementioned image-side lens element is the sixth lens element. Therefore, the maximum effective radius of the object-side surface of the first lens element is SDfs, and the maximum effective radius of the image-side surface of the sixth lens element is SDIs.

According to the present disclosure, the lens system further includes a stop which can be located between the first lens element and the second lens element. When an axial distance between the stop and the image-side surface of the sixth lens element is SD, an axial distance between the object-side surface of the first lens element and the image-side surface of the sixth lens element is TD, the following condition can be satisfied: $0.65<SD/TD<0.90$. Therefore, it is favorable for obtaining a balance between the telecentric and the wide-angle characteristics.

When an axial distance between the first lens element and the second lens element is T12, an axial distance between the fourth lens element and the fifth lens element is T45, the following condition can be satisfied: $2.0<T12/T45$. Therefore, the axial distances between every two adjacent lens elements are properly distributed so that it is favorable for assembling the lens elements so as to improve the manufacturing yield rate.

When the focal length of the lens system is f, a curvature radius of an image-side surface of a lens element being the closest one to the image surface among all lens elements with refractive power is RL, the following condition can be satisfied: $0.4<f/RL<3.0$. Therefore, it is favorable for reducing a back focal length of the lens system so as to stay in a compact size thereof. In some embodiments, when the lens system includes a total of six lens elements with refractive power which are, in order from the object side to the image side, the first lens element, the second lens element, the third lens element, the fourth lens element, the fifth lens element and the sixth lens element with refractive power, the aforementioned lens element being the closest one to the image surface is the sixth lens element, and the curvature radius of the image-side surface of the sixth lens element is RL. When an Abbe number of the second lens element is V2, an Abbe number of the fifth lens element is V5, the following condition can be satisfied: $V2+V5<60$. Therefore, it is favorable for correcting the chromatic aberration of the lens system.

When the focal length of the lens system is f, a curvature radius of the object-side surface of the second lens element is R3, the following condition can be satisfied: $0.25<f/R3$. Therefore, it is favorable for avoiding overloading the refractive power on the second lens element so as to prevent the second lens element from being overly curved, thereby reducing molding problems.

When a maximum refractive index among the first lens element, the second lens element, the third lens element, the fourth lens element, the fifth lens element and the sixth lens element is Nmax, the following condition can be satisfied: $1.60<Nmax<1.70$. Therefore, it is favorable for properly distributing the refractive power of the lens system while choosing proper material for each lens element.

When the axial distance between the object-side surface of the first lens element and the image surface is TL, the following condition can be satisfied: $TL<5.0$ mm. Therefore, it is favorable for reducing the total track length of the lens system so as to keep in a compact size thereof.

When the focal length of the lens system is f, an entrance pupil diameter of the lens system is EPD, the following condition can be satisfied: $f/EPD<2.65$. Therefore, it is favorable for obtaining a large aperture for receiving sufficient incoming light, thereby increasing the image quality in a low light condition.

According to the present disclosure, an aperture stop can be configured as a front stop or a middle stop. A front stop disposed between an imaged object and the first lens element can provide a longer distance between an exit pupil of the lens system and the image surface to produce a telecentric effect, and thereby improves the image-sensing efficiency of an image sensor (for example, CCD or CMOS). A middle stop disposed between the first lens element and the image surface is favorable for enlarging the view angle of the lens system and thereby provides a wider field of view for the same.

According to the present disclosure, the lens elements thereof can be made of glass or plastic material. When the lens elements are made of glass material, the distribution of the refractive power of the lens system may be more flexible to design. When the lens elements are made of plastic material, the manufacturing cost can be effectively reduced. According to the present disclosure, at least three of the first lens element, the second lens element, the third lens element, the fourth lens element, the fifth lens element and the sixth lens element are made of plastic material. Furthermore, surfaces of each lens element can be arranged to be aspheric, since the aspheric surface of the lens element is easy to form a shape other than spherical surface so as to have more controllable variables for eliminating the aberration thereof, and to further decrease the required number of the lens elements. Therefore, the total track length of the lens system can also be reduced.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, an image surface of the lens system, based on the corresponding image sensor, can be flat or curved, especially a curved surface being concave facing towards the object side of the lens system.

According to the present disclosure, the lens system can include at least one stop, such as an aperture stop, a glare stop or a field stop. Said glare stop or said field stop is set for eliminating the stray light and thereby improving the image quality thereof.

According to the present disclosure, an image capturing unit is provided. The image capturing unit includes the lens system according to the aforementioned lens system of the present disclosure, and an image sensor, wherein the image sensor is disposed on the image side of the aforementioned lens system, that is, the image sensor can be disposed on or near an image surface of the aforementioned lens system. In some embodiments, the image capturing unit can further include a barrel member, a holding member or a combination thereof.

Figure 16:
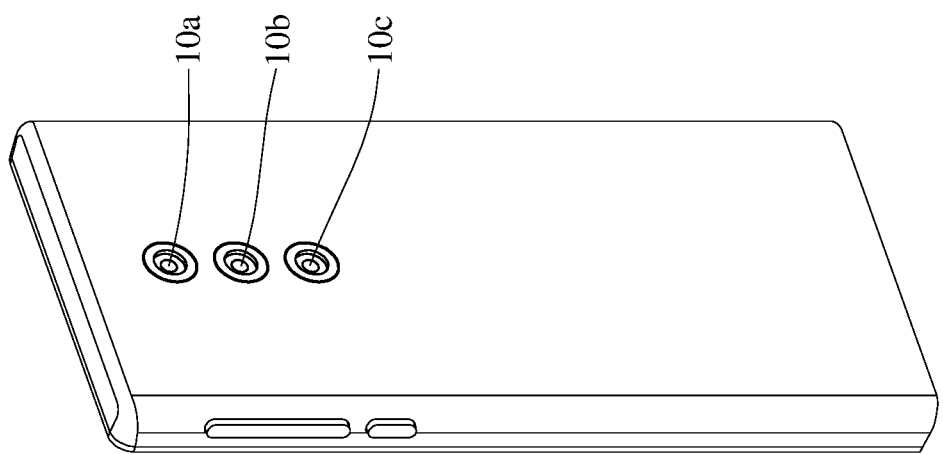
FIG. 16 shows an electronic device according to one embodiment.

In FIG. 16 and FIG. 17, an image capturing device may be installed in, but not limited to, an electronic device, including a smart phone (FIG. 16 and FIG. 17), a tablet personal computer or a wearable device. The electronic devices shown in the figures are only exemplary for showing the image capturing device of the present disclosure installed in an electronic device and are not limited thereto. In detail, according to the present disclosure, the electronic device at least includes a first image capturing unit 10a, a second image capturing unit 10b and a third image capturing unit 10c.

The first image capturing unit 10a includes a first lens system and a first image sensor. The second image capturing unit 10b includes a second lens system and a second image sensor. The third image capturing unit 10c includes a third lens system and a third image sensor. The first lens system 10a, the second lens system 10b and the third lens system 10c are all single focus lens systems. The first lens system 10a, the second lens system 10b and the third lens system 10c have different fields of view from one another. Among the first lens system 10a, the second lens system 10b and the third lens system 10c, the first lens system 10a is the lens system according to the present disclosure. Therefore, the electronic device is for capturing the images by different image capturing units (For example, the electronic device captures the images by an image capturing unit having a smaller field of view and another having a larger field of view). Moreover, the electronic device produces a composite image by combining the raw images captured by the first image capturing unit 10a, the second image capturing unit 10b and the third image capturing unit 10c with post-processing techniques (such as digital zoom, depth of focus or 3D imaging). Compared with a traditional electronic device including a complex electro-mechanical part for zoom, the electronic device of the present disclosure is more favorable for keeping in a compact size thereof.

Figure 20:
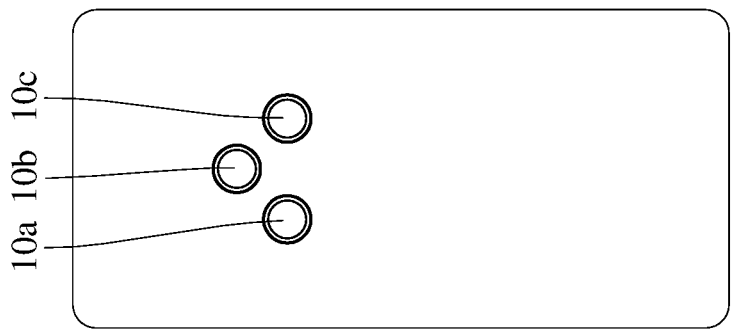
FIG. 20 shows an arrangement of the image capturing units according to still another embodiment.
Figure 19:
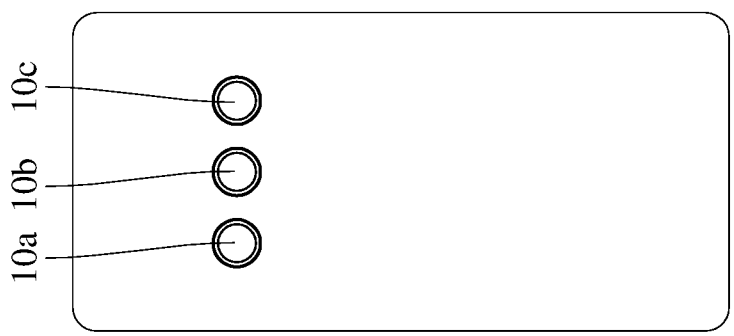
FIG. 19 shows an arrangement of the image capturing units according to another embodiment.
Figure 18:
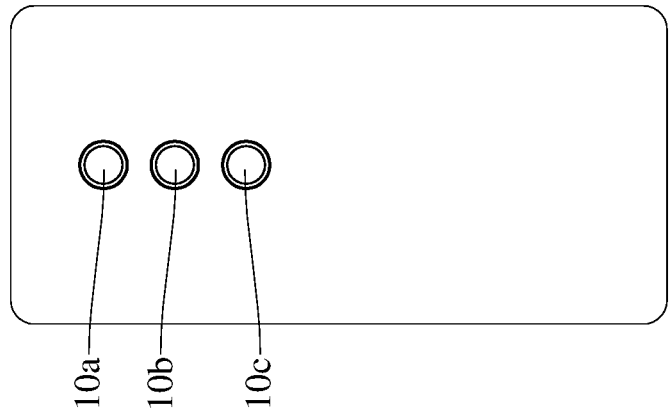
FIG. 18 shows an arrangement of the image capturing units according to one embodiment.

According to the present disclosure, the number of the image capturing units of the electronic device is not limited thereto. For example, the electronic device can include more than three image capturing units which utilize the lens systems according to the present disclosure. Furthermore, the first lens system 10a, the second lens system 10b and the third lens system 10c can be disposed in a vertical (FIG. 18), horizontal (FIG. 19) or triangular (FIG. 20) arrangement. According to the present disclosure, the arrangement and the positions of the first lens system 10a, the second lens system 10b and the third lens system 10c can be adjusted. In some embodiments, the electronic device can further include, but not limited to, a display unit, a control unit, a storage unit, a random access memory unit (RAM), a read only memory unit (ROM) or a combination thereof.

According to the present disclosure, the lens system can be optionally applied to moving focus optical systems. Furthermore, the lens system is featured with good capability in aberration corrections resulting high image quality, and can be applied to 3D (three-dimensional) image capturing applications, in products such as digital cameras, mobile devices, digital tablets, wearable devices, smart televisions, network surveillance devices, motion sensing input devices, dashboard cameras, vehicle backup cameras and other electronic imaging devices. According to the above description of the present disclosure, the following specific embodiments are provided for further explanation.

1st Embodiment

Figure 2:
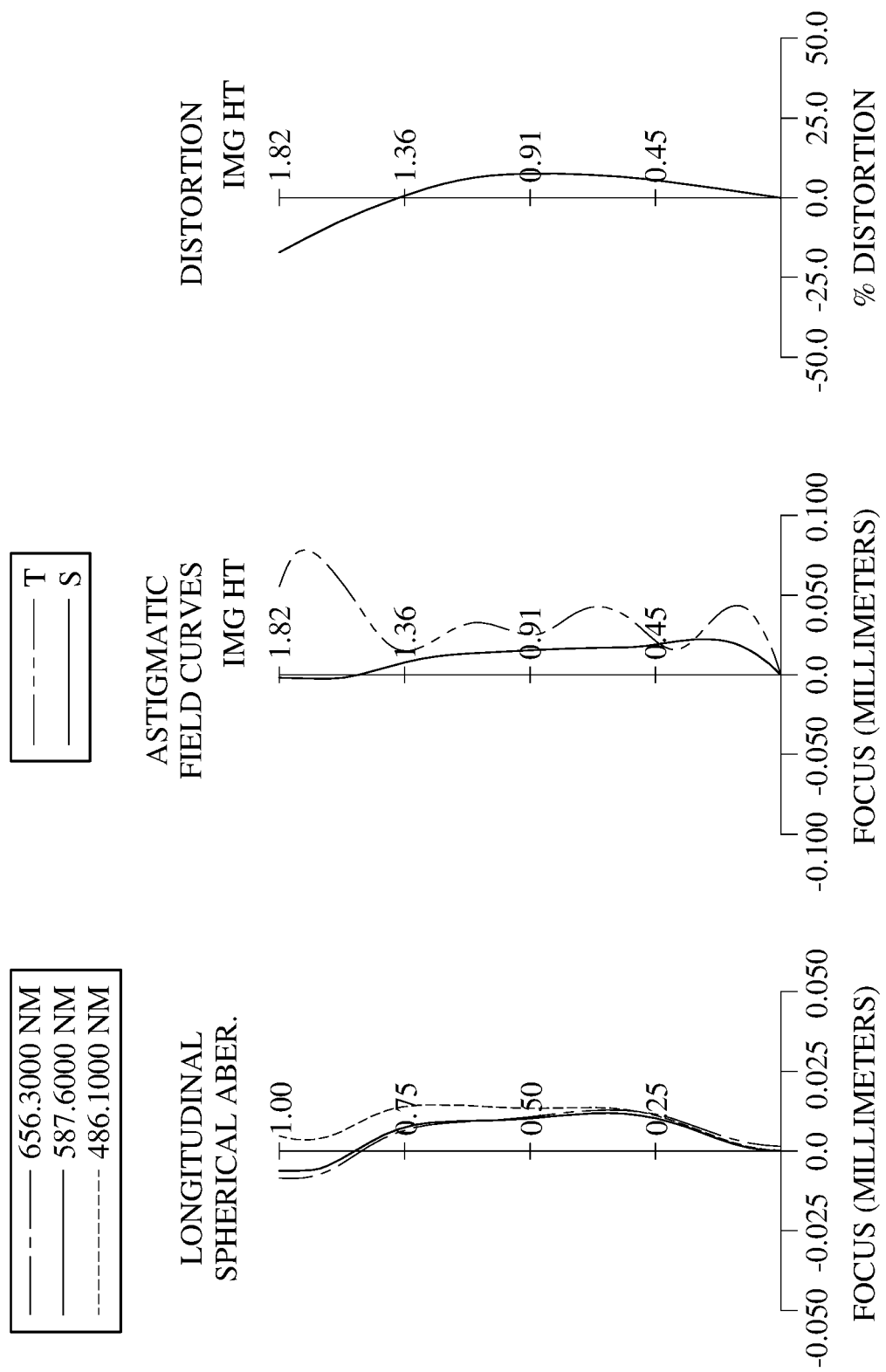
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the lens system (its reference numeral is omitted) of the present disclosure and an image sensor 190. The lens system includes, in order from an object side to an image side, a first lens element 110, an aperture stop 100, a second lens element 120, a third lens element 130, a fourth lens element 140, a fifth lens element 150, a sixth lens element 160, an IR-cut filter 170 and an image surface 180, wherein the lens system has a total of six non-cemented lens elements (110-160) with refractive power. There is an air gap in a paraxial region between every two of the first lens element 110, the second lens element 120, the third lens element 130, the fourth lens element 140, the fifth lens element 150 and the sixth lens element 160 that are adjacent to each other. In this embodiment, the first lens element 110 is an object-side lens element being the closest lens element to an imaged object among all lens elements with refractive power, and the sixth lens element 160 is an image-side lens element being the closest lens element to the image surface 180 among all lens elements with refractive power.

The first lens element 110 with negative refractive power has an object-side surface 111 being concave in a paraxial region thereof and an image-side surface 112 being concave in a paraxial region thereof. The first lens element 110 is made of plastic material and has the object-side surface 111 and the image-side surface 112 being both aspheric.

The second lens element 120 with positive refractive power has an object-side surface 121 being convex in a paraxial region thereof and an image-side surface 122 being concave in a paraxial region thereof. The second lens element 120 is made of plastic material and has the object-side surface 121 and the image-side surface 122 being both aspheric.

The third lens element 130 with positive refractive power has an object-side surface 131 being concave in a paraxial region thereof and an image-side surface 132 being convex in a paraxial region thereof. The third lens element 130 is made of plastic material and has the object-side surface 131 and the image-side surface 132 being both aspheric.

The fourth lens element 140 with positive refractive power has an object-side surface 141 being convex in a paraxial region thereof and an image-side surface 142 being convex in a paraxial region thereof. The fourth lens element 140 is made of plastic material and has the object-side surface 141 and the image-side surface 142 being both aspheric.

The fifth lens element 150 with negative refractive power has an object-side surface 151 being concave in a paraxial region thereof and an image-side surface 152 being convex in a paraxial region thereof. The fifth lens element 150 is made of plastic material and has the object-side surface 151 and the image-side surface 152 being both aspheric. The image-side surface 152 of the fifth lens element 150 has at least one concave shape in an off-axis region thereof.

The sixth lens element 160 with positive refractive power has an object-side surface 161 being convex in a paraxial region thereof and an image-side surface 162 being concave in a paraxial region thereof. The sixth lens element 160 is made of plastic material and has the object-side surface 161 and the image-side surface 162 being both aspheric. The image-side surface 162 of the sixth lens element 160 has at least one convex shape in an off-axis region thereof. The image-side surface 162 of the sixth lens element 160 has at least one inflection point in an off-axis region thereof.

The IR-cut filter 170 is made of glass and located between the sixth lens element 160 and the image surface 180, and will not affect the focal length of the lens system. The image sensor 190 is disposed on or near the image surface 180 of the lens system.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_{i}(Ai) \times (Y^i),$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14 and 16.

In the lens system of the image capturing unit according to the 1st embodiment, when a focal length of the lens system is f, an f-number of the lens system is Fno, and half of a maximal field of view of the lens system is HFOV, these parameters have the following values: f=1.38 millimeters (mm); Fno=2.45; and HFOV=57.7 degrees (deg.).

When half of the maximal field of view of the lens system is HFOV, the following condition is satisfied: tan(HFOV)=1.58.

When a maximum refractive index among the first lens element 110, the second lens element 120, the third lens element 130, the fourth lens element 140, the fifth lens element 150 and the sixth lens element 160 is Nmax, the following condition is satisfied: Nmax=1.650.

When an Abbe number of the second lens element 120 is V2, an Abbe number of the fifth lens element 150 is V5, the following condition is satisfied: V2+V5=45.0.

When an axial distance between the stop 100 and the image-side surface 162 of the sixth lens element 160 is SD, an axial distance between the object-side surface 111 of the first lens element 110 and the image-side surface 162 of the sixth lens element 160 is TD, the following condition is satisfied: SD/TD=0.75.

When an axial distance between the first lens element 110 and the second lens element 120 is T12, an axial distance between the fourth lens element 140 and the fifth lens element 150 is T45, the following condition is satisfied: T12/T45=7.93.

When an axial distance between the object-side surface 111 of the first lens element 110 and the image surface 180 is TL, the following condition is satisfied: TL=4.19 mm.

When the axial distance between the object-side surface 111 of the first lens element 110 and the image surface 180 is TL, a maximum image height of the lens system is ImgH, the following condition is satisfied: TL/ImgH=2.31.

When the axial distance between the object-side surface 111 of the first lens element 110 and the image surface 180 is TL, half of the maximal field of view of the lens system is HFOV, the following condition is satisfied: TL/sin (1.6*HFOV)=4.20 mm.

When the focal length of the lens system is f, a curvature radius of the object-side surface 121 of the second lens element 120 is R3, the following condition is satisfied: f/R3=0.37.

When the focal length of the lens system is f, a curvature radius of an image-side surface of a lens element being the closest one to an image surface among all lens elements with refractive power is RL, the following condition is satisfied: f/RL=0.84. In this embodiment, the lens element being the closest one to an image surface among all lens elements with refractive power is the sixth lens element 160, so that the curvature radius of the image-side surface 162 of the sixth lens element 160 is RL.

When the focal length of the lens system is f, an entrance pupil diameter of the lens system is EPD, the following condition is satisfied: f/EPD=2.45.

When a focal length of the first lens element 110 is f1, a focal length of the second lens element 120 is f2, the following condition is satisfied: |f1/f2|=0.01. When a focal length of the third lens element 130 is f3, a focal length of the fourth lens element 140 is f4, the following condition is satisfied: f3/f4=2.50.

When the focal length of the lens system is f, the focal length of the third lens element 130 is f3, the focal length of the fourth lens element 140 is f4, the following condition is satisfied: (f/f3)+(f/f4)=1.77.

When a maximum effective radius of the object-side surface 111 of the first lens element 110 is SD11, a maximum effective radius of the image-side surface 162 of the sixth lens element 160 is SD62, the following condition is satisfied: |SD11/SD62|=0.77. (In this embodiment, the maximum effective radius of the object-side surface 111 of the first lens element 110 is also defined as SDfs, and the maximum effective radius of the image-side surface 162 of the sixth lens element 160 is also defined as SDIs. Therefore, the following condition is satisfied: |SDfs/SDIs|=0.77.)

The detailed optical data of the 1st embodiment are shown in Table 1 and the aspheric surface data are shown in Table 2 below.

TABLE 1

1st Embodiment
f = 1.38 mm, Fno = 2.45, HFOV = 57.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −14.847 | (ASP) | 0.240 | Plastic | 1.514 | 56.8 | −2.61 |
| 2 | | 1.481 | (ASP) | 0.629 | | | | |
| 3 | Ape. Stop | Plano | | 0.013 | | | | |
| 4 | Lens 2 | 3.731 | (ASP) | 0.220 | Plastic | 1.650 | 21.5 | 230.77 |
| 5 | | 3.737 | (ASP) | 0.051 | | | | |
| 6 | Lens 3 | −2.993 | (ASP) | 0.427 | Plastic | 1.544 | 55.9 | 2.73 |

TABLE 1-continued

1st Embodiment
f = 1.38 mm, Fno = 2.45, HFOV = 57.7 deg.

| Surface # | | Curvature Radius | | Thickness | Material | Index | Abbe # | Focal Length |
|---|---|---|---|---|---|---|---|---|
| 7 | | −1.043 | (ASP) | 0.035 | | | | |
| 8 | Lens 4 | 1.360 | (ASP) | 0.741 | Plastic | 1.544 | 55.9 | 1.09 |
| 9 | | −0.855 | (ASP) | 0.081 | | | | |
| 10 | Lens 5 | −0.580 | (ASP) | 0.250 | Plastic | 1.639 | 23.5 | −1.41 |
| 11 | | −1.913 | (ASP) | 0.411 | | | | |
| 12 | Lens 6 | 1.683 | (ASP) | 0.358 | Plastic | 1.639 | 23.5 | 46.04 |
| 13 | | 1.637 | (ASP) | 0.350 | | | | |
| 14 | IR-cut filter | Plano | | 0.210 | Glass | 1.517 | 64.2 | — |
| 15 | | Plano | | 0.176 | | | | |
| 16 | Image | Plano | | — | | | | |

Note:
Reference wavelength is 587.6 nm (d-line).
Effective radius of Surface 10 is 0.880 mm.

TABLE 2

Aspheric Coefficients

| | Surface # | | | | | |
|---|---|---|---|---|---|---|
| | 1 | 2 | 4 | 5 | 6 | 7 |
| k = | −1.0000E+00 | −4.8502E+01 | −5.0000E+01 | −9.0000E+01 | −1.0304E+01 | −6.5826E−01 |
| A4 = | 9.6006E−01 | 2.6386E+00 | −5.5614E−01 | 1.8541E−01 | 7.4920E−01 | −1.2400E+00 |
| A6 = | −2.0471E+00 | −7.8023E+00 | −4.1588E+00 | −3.2258E+00 | −4.7732E−01 | 8.8325E+00 |
| A8 = | 3.4102E+00 | 1.9121E+01 | 1.5111E+01 | 4.8820E+00 | 5.1562E+00 | −3.8482E+01 |
| A10 = | −3.4988E+00 | −1.8369E+01 | −7.3505E+01 | −3.0208E−01 | −1.8503E+01 | 9.6977E+01 |
| A12 = | 1.9497E+00 | — | — | −3.2919E+01 | 2.0568E+01 | −8.5090E+01 |
| A14 = | −4.5815E−01 | — | — | — | — | — |

| | Surface # | | | | | |
|---|---|---|---|---|---|---|
| | 8 | 9 | 10 | 11 | 12 | 13 |
| k = | −3.7471E+01 | −1.6551E−01 | −3.6879E+00 | −1.2850E+00 | −9.0000E+01 | −1.0000E+00 |
| A4 = | 3.6186E−01 | 1.8905E+00 | 1.7988E+00 | 1.0507E+00 | 5.4696E−01 | −1.1850E−01 |
| A6 = | −8.9405E−01 | −6.8344E+00 | −7.0604E+00 | −1.2741E+00 | −5.0932E+00 | −7.3790E−01 |
| A8 = | 1.3113E+00 | 1.3503E+01 | 1.3558E+01 | 4.1042E−01 | 1.5722E+01 | 1.6876E+00 |
| A10 = | −6.6689E−01 | −1.3341E+01 | −1.6084E+01 | 4.2292E−01 | −2.8627E+01 | −1.9974E+00 |
| A12 = | — | 6.0705E+00 | 1.1554E+01 | −4.4054E−01 | 3.0503E+01 | 1.3321E+00 |
| A14 = | — | — | −3.5506E+00 | 1.1692E−01 | −1.7360E+01 | −4.7199E−01 |
| A16 = | — | — | — | — | 3.9876E+00 | 6.8730E−02 |

In Table 1, the curvature radius, the thickness and the focal length are shown in millimeters (mm). Surface numbers 0-16 represent the surfaces sequentially arranged from the object-side to the image-side along the optical axis. In Table 2, k represents the conic coefficient of the equation of the aspheric surface profiles. A4-A16 represent the aspheric coefficients ranging from the 4th order to the 16th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
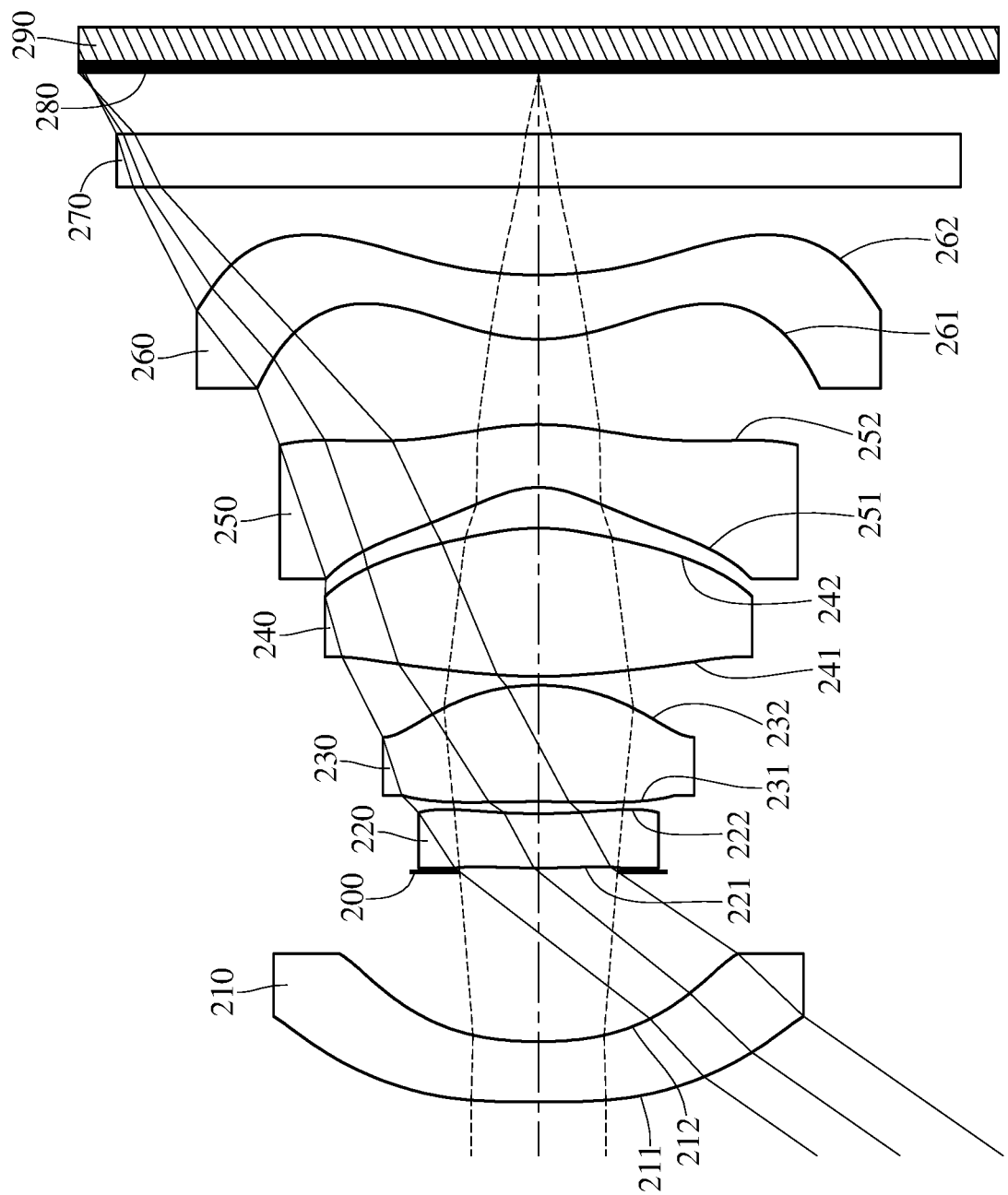
FIG. 3 is a schematic view of an image capturing unit according to the 2nd embodiment of the present disclosure.
Figure 4:
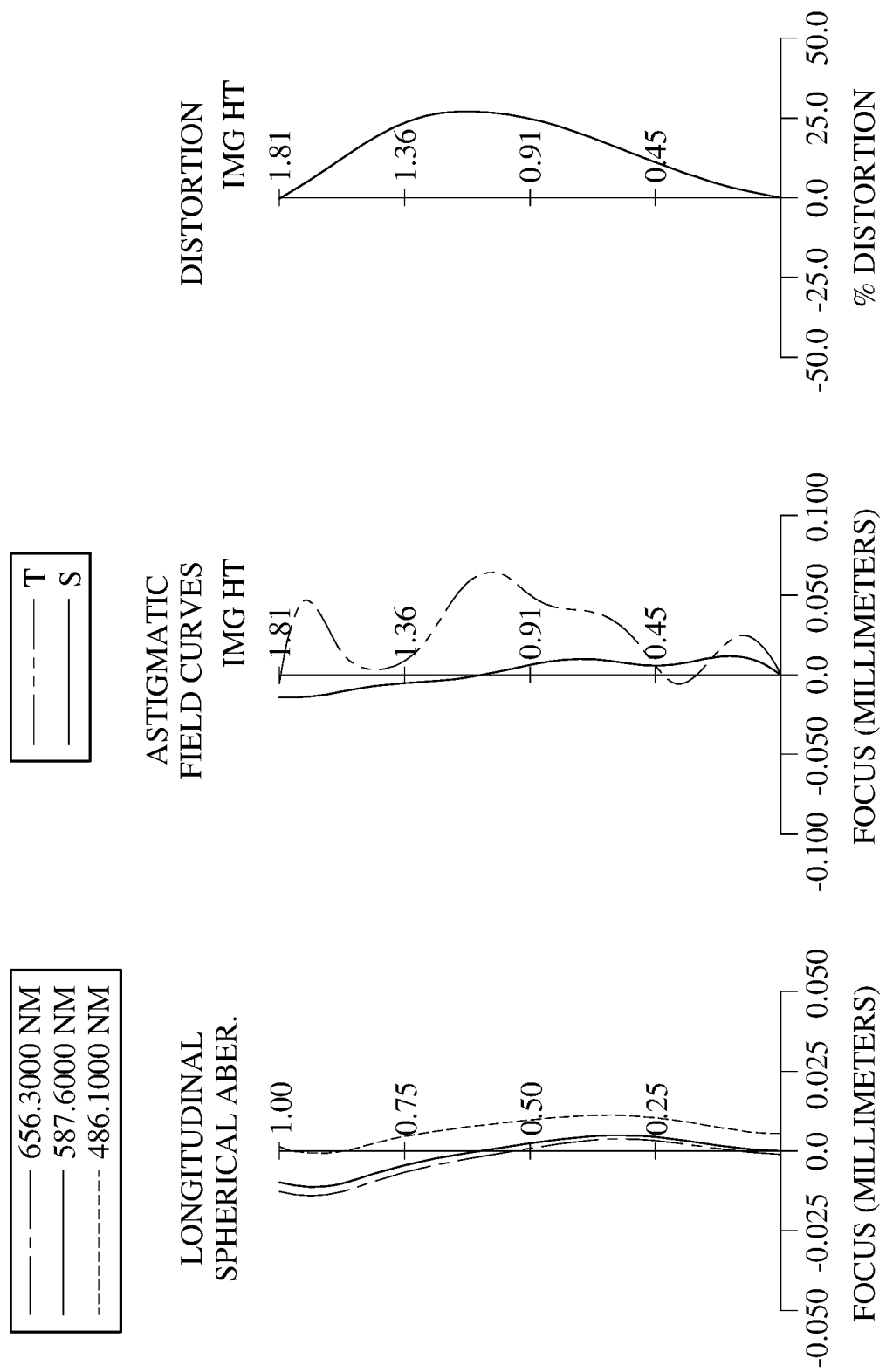
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the lens system (its reference numeral is omitted) of the present disclosure and an image sensor 290. The lens system includes, in order from an object side to an image side, a first lens element 210, an aperture stop 200, a second lens element 220, a third lens element 230, a fourth lens element 240, a fifth lens element 250, a sixth lens element 260, an IR-cut filter 270 and an image surface 280, wherein the lens system has a total of six non-cemented lens elements (210-260) with refractive power. There is an air gap in a paraxial region between every two of the first lens element 210, the second lens element 220, the third lens element 230, the fourth lens element 240, the fifth lens element 250 and the sixth lens element 260 that are adjacent to each other. In this embodiment, the first lens element 210 is an object-side lens element being the closest lens element to an imaged object among all lens elements with refractive power, and the sixth lens element 260 is an image-side lens element being the closest lens element to the image surface 280 among all lens elements with refractive power.

The first lens element 210 with negative refractive power has an object-side surface 211 being convex in a paraxial region thereof and an image-side surface 212 being concave in a paraxial region thereof. The first lens element 210 is made of plastic material and has the object-side surface 211 and the image-side surface 212 being both aspheric.

The second lens element 220 with negative refractive power has an object-side surface 221 being convex in a paraxial region thereof and an image-side surface 222 being concave in a paraxial region thereof. The second lens element 220 is made of plastic material and has the object-side surface 221 and the image-side surface 222 being both aspheric.

The third lens element 230 with positive refractive power has an object-side surface 231 being concave in a paraxial region thereof and an image-side surface 232 being convex in a paraxial region thereof. The third lens element 230 is made of plastic material and has the object-side surface 231 and the image-side surface 232 being both aspheric.

The fourth lens element 240 with positive refractive power has an object-side surface 241 being convex in a paraxial region thereof and an image-side surface 242 being convex in a paraxial region thereof. The fourth lens element 240 is made of plastic material and has the object-side surface 241 and the image-side surface 242 being both aspheric.

The fifth lens element 250 with negative refractive power has an object-side surface 251 being concave in a paraxial region thereof and an image-side surface 252 being convex in a paraxial region thereof. The fifth lens element 250 is made of plastic material and has the object-side surface 251 and the image-side surface 252 being both aspheric. The image-side surface 252 of the fifth lens element 250 has at least one concave shape in an off-axis region thereof.

The sixth lens element 260 with positive refractive power has an object-side surface 261 being convex in a paraxial region thereof and an image-side surface 262 being concave in a paraxial region thereof. The sixth lens element 260 is made of plastic material and has the object-side surface 261 and the image-side surface 262 being both aspheric. The image-side surface 262 of the sixth lens element 260 has at least one convex shape in an off-axis region thereof. The image-side surface 262 of the sixth lens element 260 has at least one inflection point in an off-axis region thereof.

The IR-cut filter 270 is made of glass and located between the sixth lens element 260 and the image surface 280, and will not affect the focal length of the lens system. The image sensor 290 is disposed on or near the image surface 280 of the lens system.

The detailed optical data of the 2nd embodiment are shown in Table 3 and the aspheric surface data are shown in Table 4 below.

TABLE 3

2nd Embodiment
f = 1.27 mm, Fno = 2.38, HFOV = 55.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 10.249 | (ASP) | 0.240 | Plastic | 1.544 | 55.9 | −3.45 |
| 2 | | 1.573 | (ASP) | 0.676 | | | | |
| 3 | Ape. Stop | Plano | | 0.015 | | | | |
| 4 | Lens 2 | 3.410 | (ASP) | 0.216 | Plastic | 1.633 | 23.4 | −13.38 |
| 5 | | 2.371 | (ASP) | 0.048 | | | | |
| 6 | Lens 3 | −6.501 | (ASP) | 0.463 | Plastic | 1.544 | 55.9 | 1.83 |
| 7 | | −0.883 | (ASP) | 0.035 | | | | |
| 8 | Lens 4 | 1.968 | (ASP) | 0.590 | Plastic | 1.544 | 55.9 | 1.17 |
| 9 | | −0.843 | (ASP) | 0.162 | | | | |
| 10 | Lens 5 | −0.349 | (ASP) | 0.250 | Plastic | 1.633 | 23.4 | −0.93 |
| 11 | | −1.091 | (ASP) | 0.339 | | | | |
| 12 | Lens 6 | 0.714 | (ASP) | 0.256 | Plastic | 1.544 | 55.9 | 1.93 |
| 13 | | 1.960 | (ASP) | 0.350 | | | | |
| 14 | IR-cut filter | Plano | | 0.210 | Glass | 1.517 | 64.2 | — |
| 15 | | Plano | | 0.246 | | | | |
| 16 | Image | Plano | | — | | | | |

Note:
Reference wavelength is 587.6 nm (d-line).

TABLE 4

Aspheric Coefficients

| Surface # | | | | | | |
|---|---|---|---|---|---|---|
| | 1 | 2 | 4 | 5 | 6 | 7 |
| k = | −1.0000E+00 | −4.4496E+01 | −3.1114E+01 | −3.7751E+01 | −2.5526E+00 | −7.7429E−01 |
| A4 = | 8.6327E−01 | 2.1618E+00 | −8.9777E−01 | −1.5737E−02 | 5.3929E−01 | −1.2241E+00 |
| A6 = | −1.6889E+00 | −6.1795E+00 | −4.1560E+00 | −3.6520E+00 | −6.3771E−01 | 8.6909E+00 |
| A8 = | 2.0138E+00 | 1.2752E+01 | 2.4640E+01 | 6.5791E+00 | 5.0817E+00 | −3.8944E+01 |
| A10 = | −9.6607E−01 | −1.9248E+01 | −1.7759E+02 | 1.4561E+00 | −1.3467E+01 | 9.7362E+01 |
| A12 = | −5.1757E−01 | 3.0029E+01 | −1.7440E−12 | −6.1967E+01 | 1.3258E+01 | −8.1776E+01 |
| A14 = | 8.6486E−01 | −3.9427E+01 | — | −3.1787E−13 | — | — |
| A16 = | −3.1387E−01 | 2.1191E+01 | — | — | — | — |

| Surface # | | | | | | |
|---|---|---|---|---|---|---|
| | 8 | 9 | 10 | 11 | 12 | 13 |
| k = | −8.9679E+01 | −1.5889E−01 | −2.8197E+00 | −4.4558E−01 | −9.3513E+00 | −1.1324E+01 |
| A4 = | 1.9930E−01 | 2.2065E+00 | 2.0327E+00 | 1.2142E+00 | 9.4140E−01 | 6.3442E−01 |
| A6 = | −5.9724E−01 | −6.9258E+00 | −7.0631E+00 | −1.2482E+00 | −6.0599E+00 | −1.9021E+00 |
| A8 = | 1.0035E+00 | 1.3331E+01 | 1.3473E+01 | 4.0414E−01 | 1.5863E+01 | 2.7268E+00 |

TABLE 4-continued

| Aspheric Coefficients | | | | | |
|---|---|---|---|---|---|
| A10 = | −7.3762E−01 | −1.3476E+01 | −1.6291E+01 | 4.0739E−01 | −2.5124E+01 | −2.5667E+00 |
| A12 = | −2.5313E−02 | 5.8272E+00 | 1.1315E+01 | −4.5463E−01 | 2.3415E+01 | 1.5276E+00 |
| A14 = | — | — | −3.6326E+00 | 1.3108E−01 | −1.1731E+01 | −5.1705E−01 |
| A16 = | — | — | — | — | 2.4196E+00 | 7.4633E−02 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 1.27 | TL/ImgH | 2.26 |
| Fno | 2.38 | TL/sin(1.6*HFOV) [mm] | 4.10 |
| HFOV [deg.] | 55.0 | f/R3 | 0.37 |
| tan(HFOV) | 1.43 | f/RL | 0.65 |
| Nmax | 1.633 | |f1/f2| | 0.26 |
| V2 + V5 | 46.7 | f3/f4 | 1.56 |
| SD/TD | 0.72 | (f/f3) + (f/f4) | 1.78 |
| T12/T45 | 4.27 | |SD11/SD62| | 0.77 |
| TL [mm] | 4.10 | f/EPD | 2.38 |

3rd Embodiment

Figure 5:
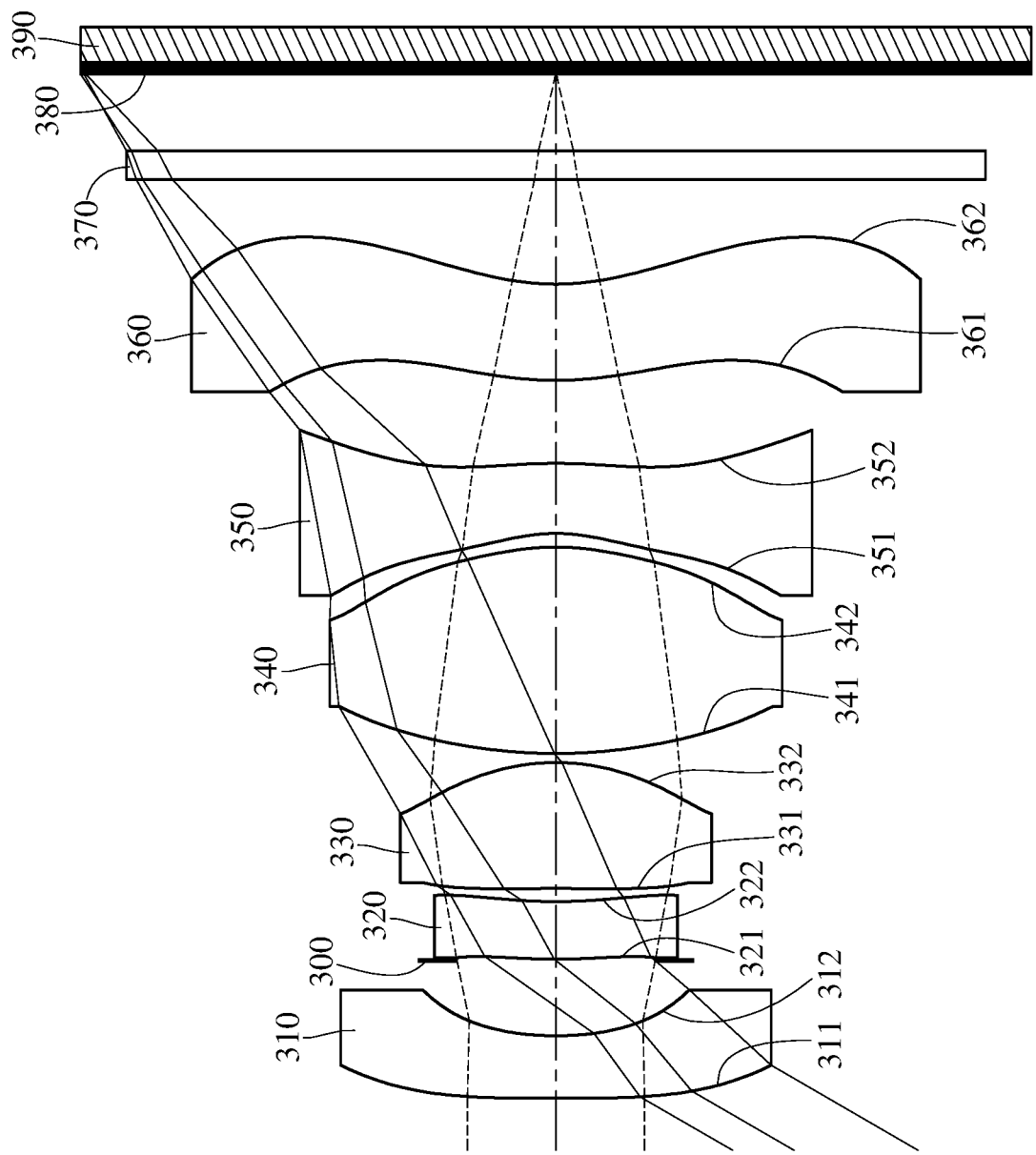
FIG. 5 is a schematic view of an image capturing unit according to the 3rd embodiment of the present disclosure.
Figure 6:
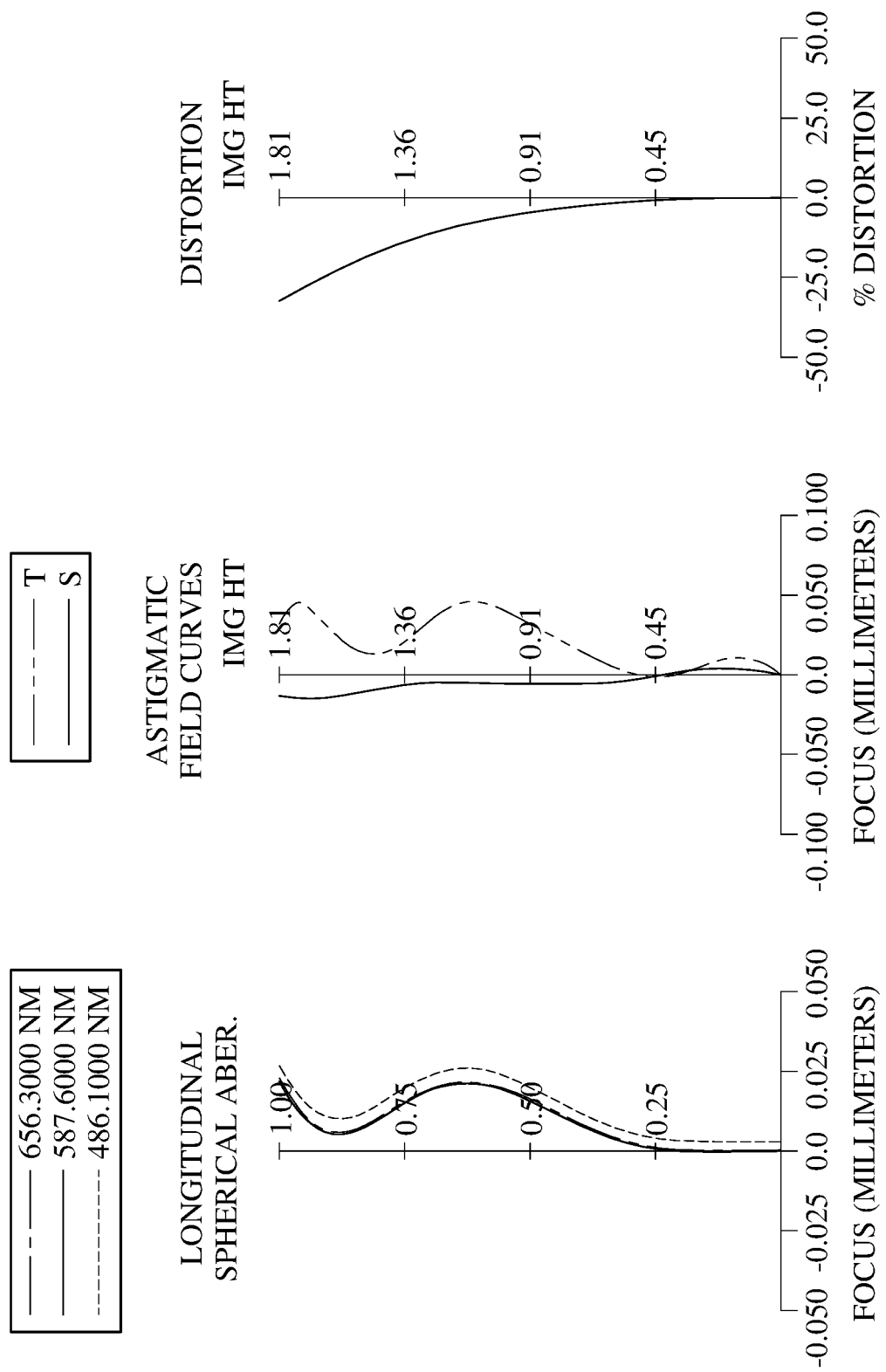
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the lens system (its reference numeral is omitted) of the present disclosure and an image sensor 390. The lens system includes, in order from an object side to an image side, a first lens element 310, an aperture stop 300, a second lens element 320, a third lens element 330, a fourth lens element 340, a fifth lens element 350, a sixth lens element 360, an IR-cut filter 370 and an image surface 380, wherein the lens system has a total of six non-cemented lens elements (310-360) with refractive power. There is an air gap in a paraxial region between every two of the first lens element 310, the second lens element 320, the third lens element 330, the fourth lens element 340, the fifth lens element 350 and the sixth lens element 360 that are adjacent to each other. In this embodiment, the first lens element 310 is an object-side lens element being the closest lens element to an imaged object among all lens elements with refractive power, and the sixth lens element 360 is an image-side lens element being the closest lens element to the image surface 380 among all lens elements with refractive power.

The first lens element 310 with negative refractive power has an object-side surface 311 being concave in a paraxial region thereof and an image-side surface 312 being concave in a paraxial region thereof. The first lens element 310 is made of plastic material and has the object-side surface 311 and the image-side surface 312 being both aspheric.

The second lens element 320 with negative refractive power has an object-side surface 321 being convex in a paraxial region thereof and an image-side surface 322 being concave in a paraxial region thereof. The second lens element 320 is made of plastic material and has the object-side surface 321 and the image-side surface 322 being both aspheric.

The third lens element 330 with positive refractive power has an object-side surface 331 being concave in a paraxial region thereof and an image-side surface 332 being convex in a paraxial region thereof. The third lens element 330 is made of plastic material and has the object-side surface 331 and the image-side surface 332 being both aspheric.

The fourth lens element 340 with positive refractive power has an object-side surface 341 being convex in a paraxial region thereof and an image-side surface 342 being convex in a paraxial region thereof. The fourth lens element 340 is made of plastic material and has the object-side surface 341 and the image-side surface 342 being both aspheric.

The fifth lens element 350 with negative refractive power has an object-side surface 351 being concave in a paraxial region thereof and an image-side surface 352 being convex in a paraxial region thereof. The fifth lens element 350 is made of plastic material and has the object-side surface 351 and the image-side surface 352 being both aspheric. The image-side surface 352 of the fifth lens element 350 has at least one concave shape in an off-axis region thereof.

The sixth lens element 360 with negative refractive power has an object-side surface 361 being convex in a paraxial region thereof and an image-side surface 362 being concave in a paraxial region thereof. The sixth lens element 360 is made of plastic material and has the object-side surface 361 and the image-side surface 362 being both aspheric. The image-side surface 362 of the sixth lens element 360 has at least one convex shape in an off-axis region thereof. The image-side surface 362 of the sixth lens element 360 has at least one inflection point in an off-axis region thereof.

The IR-cut filter 370 is made of glass and located between the sixth lens element 360 and the image surface 380, and will not affect the focal length of the lens system. The image sensor 390 is disposed on or near the image surface 380 of the lens system.

The detailed optical data of the 3rd embodiment are shown in Table 5 and the aspheric surface data are shown in Table 6 below.

TABLE 5

3rd Embodiment
f = 1.55 mm, Fno = 2.29, HFOV = 59.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −107.021 | (ASP) | 0.238 | Plastic | 1.544 | 55.9 | −2.20 |
| 2 | | 1.209 | (ASP) | 0.287 | | | | |

TABLE 5-continued

3rd Embodiment
f = 1.55 mm, Fno = 2.29, HFOV = 59.9 deg.

| Surface # | | Curvature Radius | | Thickness | Material | Index | Abbe # | Focal Length |
|---|---|---|---|---|---|---|---|---|
| 3 | Ape. Stop | Plano | | 0.006 | | | | |
| 4 | Lens 2 | 2.425 | (ASP) | 0.220 | Plastic | 1.639 | 23.5 | −19.77 |
| 5 | | 1.962 | (ASP) | 0.050 | | | | |
| 6 | Lens 3 | −15.680 | (ASP) | 0.481 | Plastic | 1.544 | 55.9 | 1.66 |
| 7 | | −0.861 | (ASP) | 0.035 | | | | |
| 8 | Lens 4 | 1.997 | (ASP) | 0.789 | Plastic | 1.544 | 55.9 | 1.27 |
| 9 | | −0.908 | (ASP) | 0.052 | | | | |
| 10 | Lens 5 | −0.645 | (ASP) | 0.268 | Plastic | 1.639 | 23.5 | −1.67 |
| 11 | | −1.891 | (ASP) | 0.317 | | | | |
| 12 | Lens 6 | 1.317 | (ASP) | 0.368 | Plastic | 1.639 | 23.5 | −10.00 |
| 13 | | 0.973 | (ASP) | 0.400 | | | | |
| 14 | IR-cut filter | Plano | | 0.110 | Glass | 1.517 | 64.2 | — |
| 15 | | Plano | | 0.293 | | | | |
| 16 | Image | Plano | | — | | | | |

Note:
Reference wavelength is 587.6 nm (d-line).
Effective radius of Surface 10 is 0.860 mm.

TABLE 6

Aspheric Coefficients

| | Surface # | | | | | |
|---|---|---|---|---|---|---|
| | 1 | 2 | 4 | 5 | 6 | 7 |
| k = | −5.0000E+01 | −2.4772E+01 | −4.3022E+01 | −4.2722E+01 | −6.5636E+01 | −1.8277E+00 |
| A4 = | 5.7783E−01 | 2.6199E+00 | −6.0117E−01 | 2.2233E−01 | 3.5084E−01 | −5.1274E−01 |
| A6 = | −1.1144E+00 | −9.8086E+00 | −1.8266E+00 | −5.0058E+00 | 3.1549E−02 | 2.7517E+00 |
| A8 = | 1.8973E+00 | 3.3530E+01 | −2.0273E+00 | 2.0124E+01 | 3.8172E+00 | −1.4107E+01 |
| A10 = | −1.7463E+00 | −2.3977E+01 | −7.8015E+00 | −5.0341E+01 | −1.2742E+01 | 4.0183E+01 |
| A12 = | 5.6591E−01 | −6.2273E+01 | — | 4.3927E+01 | 1.2565E+01 | −3.4622E+01 |
| A14 = | 7.6589E−02 | — | — | — | — | — |

| | Surface # | | | | | |
|---|---|---|---|---|---|---|
| | 8 | 9 | 10 | 11 | 12 | 13 |
| k = | −3.0993E+01 | −1.3475E−01 | −6.4865E+00 | −6.5987E+01 | −1.1488E+00 | −4.6286E+00 |
| A4 = | 3.3391E−01 | 1.9183E−01 | 1.3786E+00 | 6.2922E−01 | −5.7596E−01 | −1.4289E−01 |
| A6 = | −5.7815E−01 | −6.7169E+00 | −4.3432E+00 | −2.0853E−01 | 3.9882E−01 | −1.1526E−01 |
| A8 = | 6.7678E−01 | 1.1961E+01 | 4.5193E+00 | −1.2896E+00 | −4.8294E−01 | 2.8707E−01 |
| A10 = | −1.2090E−01 | −1.0209E+01 | 5.6027E−01 | 2.2436E+00 | 5.6436E−01 | −2.8855E−01 |
| A12 = | −1.9575E−01 | 3.8010E+00 | −4.7488E+00 | −1.5595E+00 | −3.1479E−01 | 1.5861E−01 |
| A14 = | — | — | 2.7586E+00 | 4.1908E−01 | 7.7413E−03 | −4.7377E−02 |
| A16 = | — | — | — | — | 3.7519E−02 | 5.9462E−03 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

3rd Embodiment

| f [mm] | 1.55 | TL/ImgH | 2.16 |
|---|---|---|---|
| Fno | 2.29 | TL/sin(1.6*HFOV) [mm] | 3.93 |
| HFOV [deg.] | 59.9 | f/R3 | 0.64 |
| tan(HFOV) | 1.73 | f/RL | 1.59 |
| Nmax | 1.639 | |f1/f2| | 0.11 |
| V2 + V5 | 47.0 | f3/f4 | 1.31 |
| SD/TD | 0.83 | (f/f3) + (f/f4) | 2.15 |

-continued

3rd Embodiment

| T12/T45 | 5.63 | |SD11/SD62| | 0.59 |
|---|---|---|---|
| TL [mm] | 3.91 | f/EPD | 2.29 |

4th Embodiment

Figure 7:
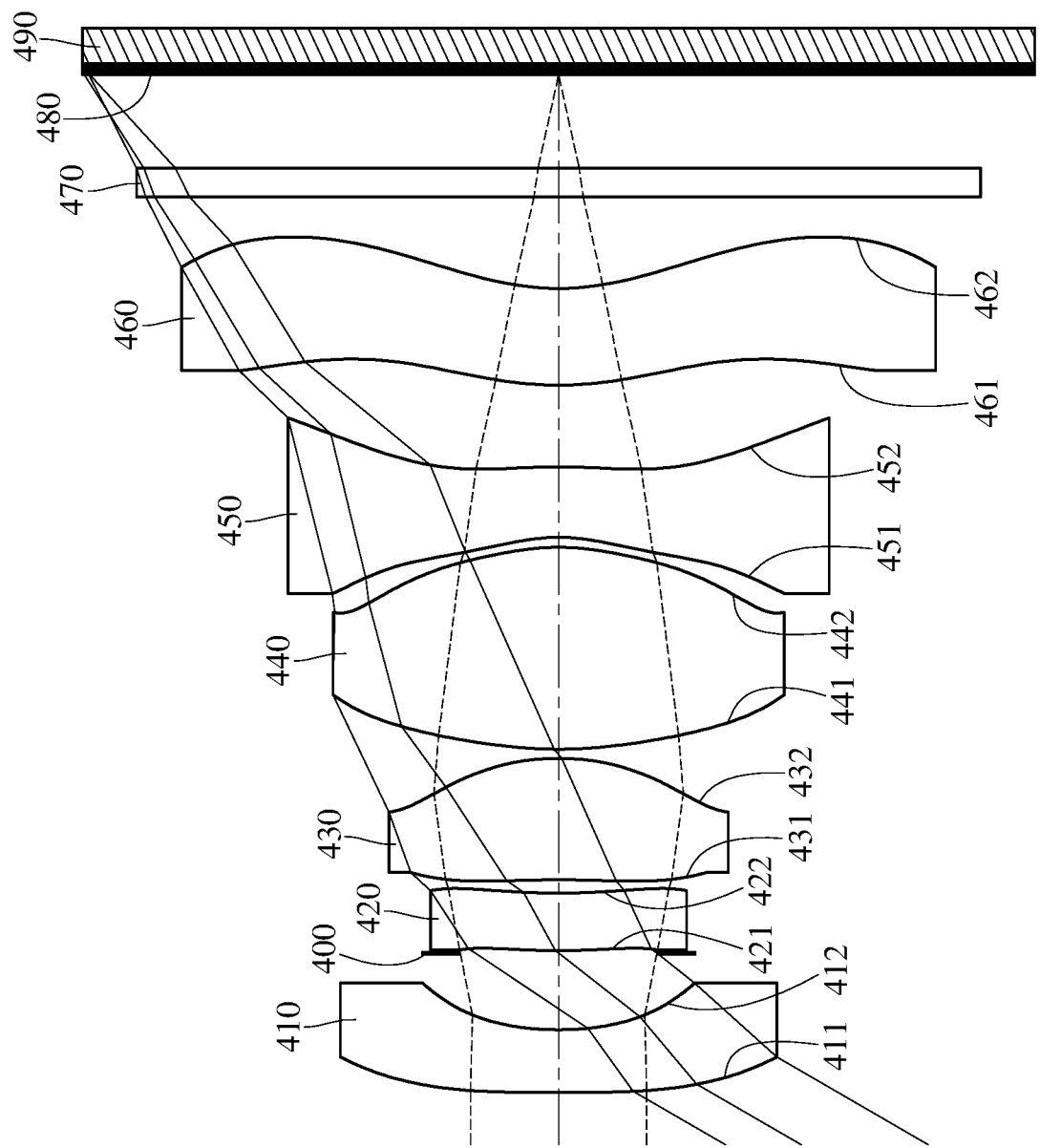
FIG. 7 is a schematic view of an image capturing unit according to the 4th embodiment of the present disclosure.
Figure 8:
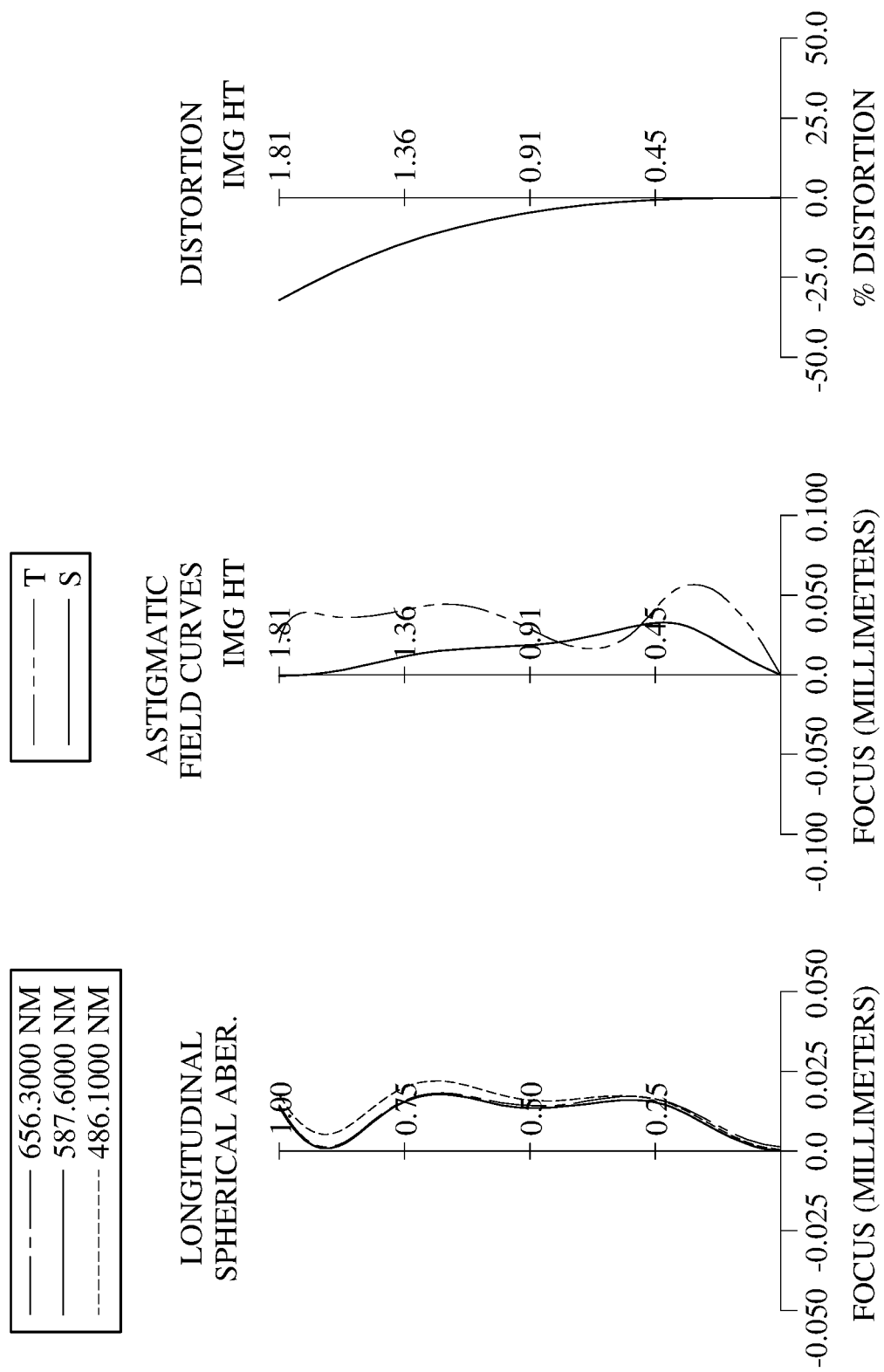
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the lens system (its reference numeral is omitted) of the present disclosure and an image sensor 490. The lens system includes, in order from an object side to an image side, a first lens element 410, an aperture stop 400, a second lens element 420, a third lens element 430, a fourth lens element 440, a fifth lens element 450, a sixth lens element 460, an IR-cut filter 470 and an image surface 480, wherein the lens system has a total of six non-cemented lens elements (410-460) with refractive power. There is an air gap in a paraxial region between every two of the first lens element 410, the second lens element 420, the third lens element 430, the fourth lens element 440, the fifth lens element 450 and the sixth lens element 460 that are adjacent to each other. In this embodiment, the first lens element 410 is an object-side lens element being the closest lens element to an imaged object among all lens elements with refractive power, and the sixth lens element 460 is an image-side lens element being the closest lens element to the image surface 480 among all lens elements with refractive power.

The first lens element 410 with negative power has an object-side surface 411 being convex in a paraxial region thereof and an image-side surface 412 being concave in a paraxial region thereof. The first lens element 410 is made of plastic material and has the object-side surface 411 and the image-side surface 412 being both aspheric.

The second lens element 420 with positive refractive power has an object-side surface 421 being convex in a paraxial region thereof and an image-side surface 422 being concave in a paraxial region thereof. The second lens element 420 is made of plastic material and has the object-side surface 421 and the image-side surface 422 being both aspheric.

The third lens element 430 with positive refractive power has an object-side surface 431 being concave in a paraxial region thereof and an image-side surface 432 being convex in a paraxial region thereof. The third lens element 430 is made of plastic material and has the object-side surface 431 and the image-side surface 432 being both aspheric.

The fourth lens element 440 with positive refractive power has an object-side surface 441 being convex in a paraxial region thereof and an image-side surface 442 being convex in a paraxial region thereof. The fourth lens element 440 is made of plastic material and has the object-side surface 441 and the image-side surface 442 being both aspheric.

The fifth lens element 450 with negative refractive power has an object-side surface 451 being concave in a paraxial region thereof and an image-side surface 452 being convex in a paraxial region thereof. The fifth lens element 450 is made of plastic material and has the object-side surface 451 and the image-side surface 452 being both aspheric. The image-side surface 452 of the fifth lens element 450 has at least one concave shape in an off-axis region thereof.

The sixth lens element 460 with negative refractive power has an object-side surface 461 being convex in a paraxial region thereof and an image-side surface 462 being concave in a paraxial region thereof. The sixth lens element 460 is made of plastic material and has the object-side surface 461 and the image-side surface 462 being both aspheric. The image-side surface 462 of the sixth lens element 460 has at least one convex shape in an off-axis region thereof. The image-side surface 462 of the sixth lens element 460 has at least one inflection point in an off-axis region thereof.

The IR-cut filter 470 is made of glass and located between the sixth lens element 460 and the image surface 480, and will not affect the focal length of the lens system. The image sensor 490 is disposed on or near the image surface 480 of the lens system.

The detailed optical data of the 4th embodiment are shown in Table 7 and the aspheric surface data are shown in Table 8 below.

TABLE 7

4th Embodiment
f = 1.54 mm, Fno = 2.29, HFOV = 60.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 50.000 | (ASP) | 0.240 | Plastic | 1.544 | 55.9 | −2.23 |
| 2 | | 1.181 | (ASP) | 0.293 | | | | |
| 3 | Ape. Stop | Plano | | 0.010 | | | | |
| 4 | Lens 2 | 2.639 | (ASP) | 0.220 | Plastic | 1.639 | 23.5 | 51.87 |
| 5 | | 2.774 | (ASP) | 0.051 | | | | |
| 6 | Lens 3 | −4.127 | (ASP) | 0.465 | Plastic | 1.544 | 55.9 | 2.17 |
| 7 | | −0.956 | (ASP) | 0.035 | | | | |
| 8 | Lens 4 | 1.515 | (ASP) | 0.773 | Plastic | 1.544 | 55.9 | 1.16 |
| 9 | | −0.890 | (ASP) | 0.038 | | | | |
| 10 | Lens 5 | −0.668 | (ASP) | 0.270 | Plastic | 1.639 | 23.5 | −1.63 |
| 11 | | −2.156 | (ASP) | 0.313 | | | | |
| 12 | Lens 6 | 1.328 | (ASP) | 0.370 | Plastic | 1.639 | 23.5 | −9.69 |
| 13 | | 0.975 | (ASP) | 0.350 | | | | |
| 14 | IR-cut filter | Plano | | 0.110 | Glass | 1.517 | 64.2 | — |
| 15 | | Plano | | 0.358 | | | | |
| 16 | Image | Plano | | — | — | | | |

Note:
Reference wavelength is 587.6 nm (d-line).
Effective radius of Surface 5 is 0.490 mm.

TABLE 8

Aspheric Coefficients

| | Surface # | | | | | |
|---|---|---|---|---|---|---|
| | 1 | 2 | 4 | 5 | 6 | 7 |
| k = | −4.9011E+01 | −2.0621E+01 | −4.8339E+01 | −6.4255E+01 | −5.0113E+01 | −1.0070E+00 |
| A4 = | 5.6109E−01 | 2.3911E+00 | −3.5700E−01 | 2.9359E−01 | 7.1587E−01 | −1.1660E+00 |
| A6 = | −1.1316E+00 | −8.0896E+00 | −5.7842E+00 | −3.8064E+00 | −9.8477E−01 | 8.6446E+00 |

TABLE 8-continued

| Aspheric Coefficients | | | | | | |
|---|---|---|---|---|---|---|
| A8 = | 2.0910E+00 | 2.8735E+01 | 2.1503E+01 | 3.6669E+00 | 4.7254E+00 | −3.9024E+01 |
| A10 = | −2.4154E+00 | −4.2951E+01 | −7.6304E+01 | 1.5649E+01 | −1.1835E+01 | 9.5133E+01 |
| A12 = | 1.4816E+00 | — | — | −6.0684E+01 | 8.9285E+00 | −8.2021E+01 |
| A14 = | −3.3837E−01 | — | — | — | — | — |

| | Surface # | | | | | |
|---|---|---|---|---|---|---|
| | 8 | 9 | 10 | 11 | 12 | 13 |
| k = | −5.1447E+01 | −1.5388E−01 | −5.7723E+00 | −8.9272E+01 | −2.3149E+00 | −1.2970E+00 |
| A4 = | 3.9804E−01 | 1.9103E+00 | 1.8678E+00 | 9.6266E−01 | −3.0656E−01 | −4.6798E−01 |
| A6 = | −9.2296E−01 | −6.9733E+00 | −7.0614E+00 | −1.2389E+00 | −1.4750E−01 | 2.5699E−01 |
| A8 = | 1.3404E+00 | 1.3533E+01 | 1.3428E+01 | 4.3373E−01 | 3.8860E−01 | −6.2075E−02 |
| A10 = | −6.0566E−01 | −1.3302E+01 | −1.6175E+01 | 4.3077E−01 | −1.3541E−01 | −2.7441E−02 |
| A12 = | — | 6.0578E+00 | 1.1544E+01 | −4.4103E−01 | −1.2050E−01 | 2.7972E−02 |
| A14 = | — | — | −3.5418E+00 | 1.1234E−01 | 1.0542E−01 | −9.7056E−03 |
| A16 = | — | — | — | — | −2.2817E−02 | 1.3088E−03 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 1.54 | TL/ImgH | 2.15 |
| Fno | 2.29 | TL/sin(1.6*HFOV) [mm] | 3.92 |
| HFOV [deg.] | 60.0 | f/R3 | 0.58 |
| tan(HFOV) | 1.73 | f/RL | 1.58 |
| Nmax | 1.639 | |f1/f2| | 0.04 |
| V2 + V5 | 47.0 | f3/f4 | 1.87 |
| SD/TD | 0.83 | (f/f3) + (f/f4) | 2.04 |
| T12/T45 | 7.97 | |SD11/SD62| | 0.58 |
| TL [mm] | 3.90 | f/EPD | 2.29 |

5th Embodiment

Figure 9:
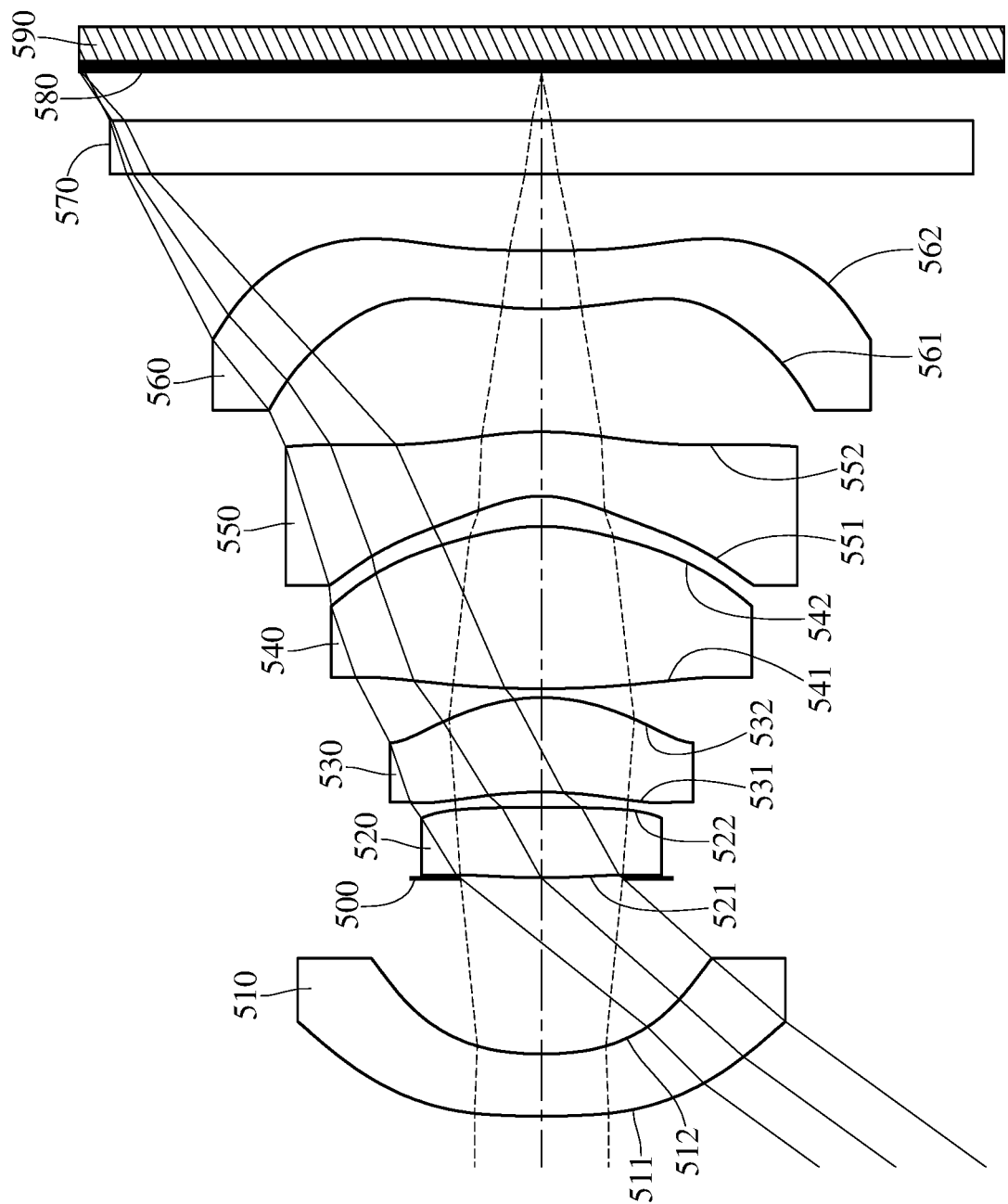
FIG. 9 is a schematic view of an image capturing unit according to the 5th embodiment of the present disclosure.
Figure 10:
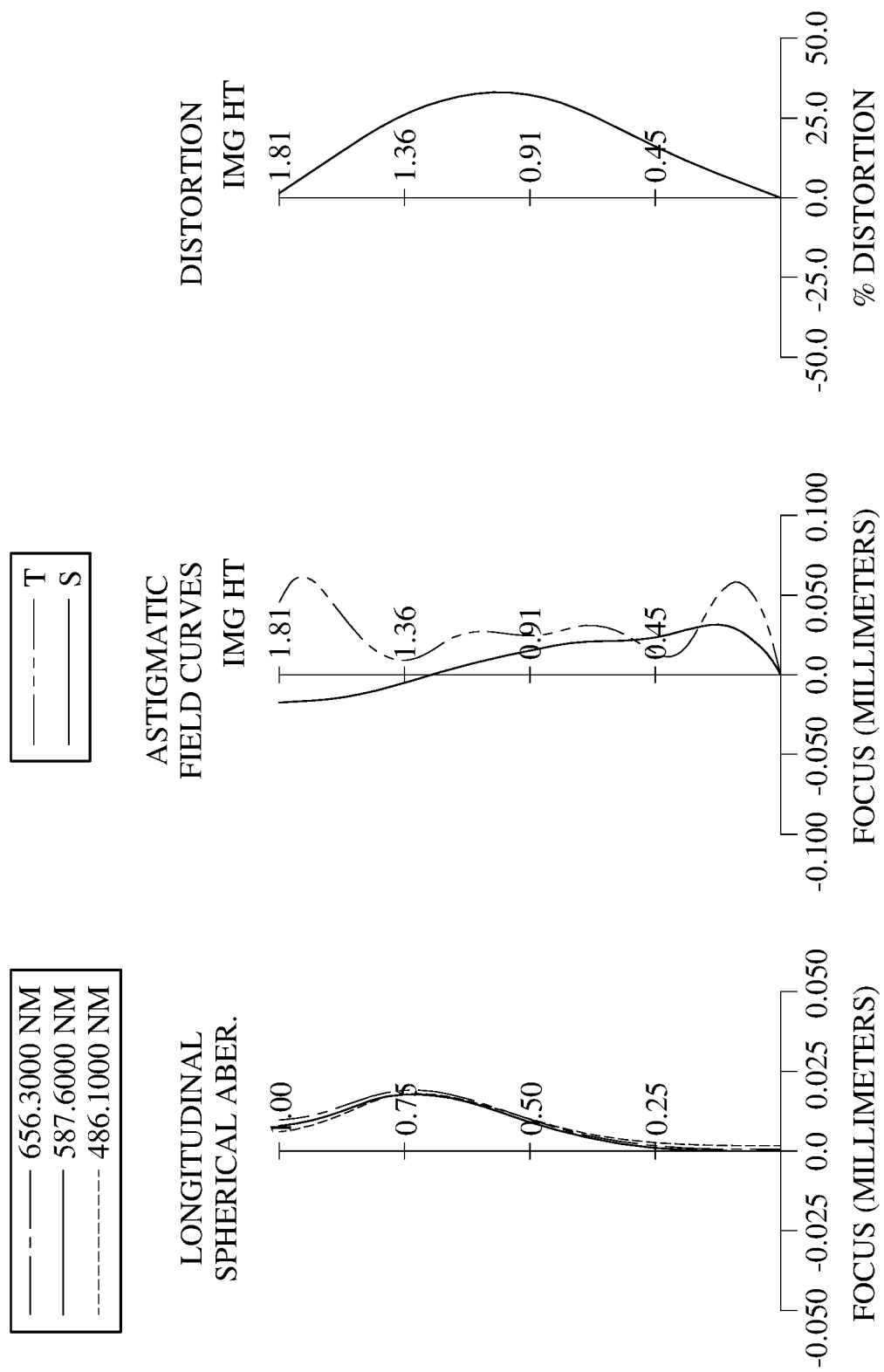
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the lens system (its reference numeral is omitted) of the present disclosure and an image sensor 590. The lens system includes, in order from an object side to an image side, a first lens element 510, an aperture stop 500, a second lens element 520, a third lens element 530, a fourth lens element 540, a fifth lens element 550, a sixth lens element 560, an IR-cut filter 570 and an image surface 580, wherein the lens system has a total of six non-cemented lens elements (510-560) with refractive power. There is an air gap in a paraxial region between every two of the first lens element 510, the second lens element 520, the third lens element 530, the fourth lens element 540, the fifth lens element 550 and the sixth lens element 560 that are adjacent to each other. In this embodiment, the first lens element 510 is an object-side lens element being the closest lens element to an imaged object among all lens elements with refractive power, and the sixth lens element 560 is an image-side lens element being the closest lens element to the image surface 580 among all lens elements with refractive power.

The first lens element 510 with negative refractive power has an object-side surface 511 being convex in a paraxial region thereof and an image-side surface 512 being concave in a paraxial region thereof. The first lens element 510 is made of plastic material and has the object-side surface 511 and the image-side surface 512 being both aspheric.

The second lens element 520 with positive refractive power has an object-side surface 521 being convex in a paraxial region thereof and an image-side surface 522 being convex in a paraxial region thereof. The second lens element 520 is made of plastic material and has the object-side surface 521 and the image-side surface 522 being both aspheric.

The third lens element 530 with positive refractive power has an object-side surface 531 being concave in a paraxial region thereof and an image-side surface 532 being convex in a paraxial region thereof. The third lens element 530 is made of plastic material and has the object-side surface 531 and the image-side surface 532 being both aspheric.

The fourth lens element 540 with positive refractive power has an object-side surface 541 being convex in a paraxial region thereof and an image-side surface 542 being convex in a paraxial region thereof. The fourth lens element 540 is made of plastic material and has the object-side surface 541 and the image-side surface 542 being both aspheric.

The fifth lens element 550 with negative refractive power has an object-side surface 551 being concave in a paraxial region thereof and an image-side surface 552 being convex in a paraxial region thereof. The fifth lens element 550 is made of plastic material and has the object-side surface 551 and the image-side surface 552 being both aspheric. The image-side surface 552 of the fifth lens element 550 has at least one concave shape in an off-axis region thereof.

The sixth lens element 560 with positive refractive power has an object-side surface 561 being convex in a paraxial region thereof and an image-side surface 562 being concave in a paraxial region thereof. The sixth lens element 560 is made of plastic material and has the object-side surface 561 and the image-side surface 562 being both aspheric. The image-side surface 562 of the sixth lens element 560 has at least one convex shape in an off-axis region thereof. The image-side surface 562 of the sixth lens element 560 has at least one inflection point in an off-axis region thereof.

The IR-cut filter 570 is made of glass and located between the sixth lens element 560 and the image surface 580, and will not affect the focal length of the lens system. The image sensor 590 is disposed on or near the image surface 580 of the lens system.

The detailed optical data of the 5th embodiment are shown in Table 9 and the aspheric surface data are shown in Table 10 below.

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 1.29 | TL/ImgH | 2.26 |
| Fno | 2.45 | TL/sin(1.6*HFOV) [mm] | 4.11 |
| HFOV [deg.] | 54.0 | f/R3 | 0.47 |
| tan(HFOV) | 1.38 | f/RL | 0.01 |

TABLE 9

5th Embodiment
f = 1.29 mm, Fno = 2.45, HFOV = 54.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 6.615 | (ASP) | 0.244 | Plastic | 1.540 | 42.1 | −3.09 |
| 2 | | 1.316 | (ASP) | 0.691 | | | | |
| 3 | Ape. Stop | Plano | | 0.002 | | | | |
| 4 | Lens 2 | 2.738 | (ASP) | 0.277 | Plastic | 1.544 | 55.9 | 3.83 |
| 6 | | −8.422 | (ASP) | 0.060 | | | | |
| 7 | Lens 3 | −1.475 | (ASP) | 0.371 | Plastic | 1.544 | 55.9 | 2.40 |
| 8 | | −0.754 | (ASP) | 0.035 | | | | |
| 9 | Lens 4 | 4.179 | (ASP) | 0.638 | Plastic | 1.544 | 55.9 | 1.26 |
| 10 | | −0.777 | (ASP) | 0.119 | | | | |
| 11 | Lens 5 | −0.431 | (ASP) | 0.253 | Plastic | 1.639 | 23.5 | −1.15 |
| 12 | | −1.284 | (ASP) | 0.483 | | | | |
| 13 | Lens 6 | 1.447 | (ASP) | 0.230 | Plastic | 1.583 | 30.2 | 2.52 |
| 14 | | 96.670 | (ASP) | 0.300 | | | | |
| 15 | IR-cut filter | Plano | | 0.210 | Glass | 1.517 | 64.2 | — |
| 16 | | Plano | | 0.191 | | | | |
| 17 | Image | Plano | | — | | | | |

Note:
Reference wavelength is 587.6 nm (d-line).

TABLE 10

Aspheric Coefficients

| Surface # | | | | | |
|---|---|---|---|---|---|
| 1 | 2 | 4 | 5 | 6 | 7 |
| k = −1.0000E+00 | −1.0000E+00 | −5.5714E+00 | −1.0000E+00 | −3.3782E+00 | −5.9623E+00 |
| A4 = 1.3042E+00 | 2.0913E+00 | −4.7083E−01 | −3.3635E−02 | 4.7592E−01 | −1.4001E+00 |
| A6 = −3.5188E+00 | −6.8313E+00 | −3.1777E+00 | −2.8004E+00 | −5.1539E−01 | 8.1368E+00 |
| A8 = 6.9557E+00 | 1.8671E+01 | 2.2051E+01 | 7.9156E+00 | 5.6121E+00 | −3.7307E+01 |
| A10 = −8.3121E+00 | −1.9461E+01 | −1.7398E+02 | −4.8884E+01 | −6.3227E+00 | 1.0007E+02 |
| A12 = 5.3275E+00 | — | — | 7.9828E+01 | 2.1290E+00 | −9.0794E+01 |
| A14 = −1.4262E+00 | — | — | — | — | — |

| Surface # | | | | | |
|---|---|---|---|---|---|
| 8 | 9 | 10 | 11 | 12 | 13 |
| k = −1.0000E+00 | −3.2940E−01 | −2.9626E+00 | −1.2040E+00 | −9.0000E+01 | −9.0000E+01 |
| A4 = 1.6237E−01 | 2.0604E+00 | 1.9111E+00 | 1.0629E+00 | 1.2332E+00 | 1.3023E+00 |
| A6 = −8.0985E−01 | −6.8144E+00 | −7.2094E+00 | −1.2607E+00 | −8.3004E+00 | −4.7428E+00 |
| A8 = 1.2045E+00 | 1.3336E+01 | 1.3476E+01 | 4.1482E−01 | 1.8889E+01 | 7.9016E+00 |
| A10 = −9.3748E−01 | −1.3615E+01 | −1.6095E+01 | 4.2085E−01 | −2.5557E+01 | −7.9314E+00 |
| A12 = — | 5.9681E+00 | 1.1565E+01 | −4.4369E−01 | 2.2115E+01 | 4.8283E+00 |
| A14 = — | — | −3.5417E+00 | 1.2445E−01 | −1.1250E+01 | −1.6420E+00 |
| A16 = — | — | — | — | 2.4957E+00 | 2.3818E−01 |

-continued

| 5th Embodiment | | | |
|---|---|---|---|
| Nmax | 1.639 | \|f1/f2\| | 0.81 |
| V2 + V5 | 79.4 | f3/f4 | 1.90 |
| SD/TD | 0.73 | (f/f3) + (f/f4) | 1.56 |
| T12/T45 | 5.82 | \|SD11/SD62\| | 0.74 |
| TL [mm] | 4.10 | f/EPD | 2.45 |

6th Embodiment

Figure 11:
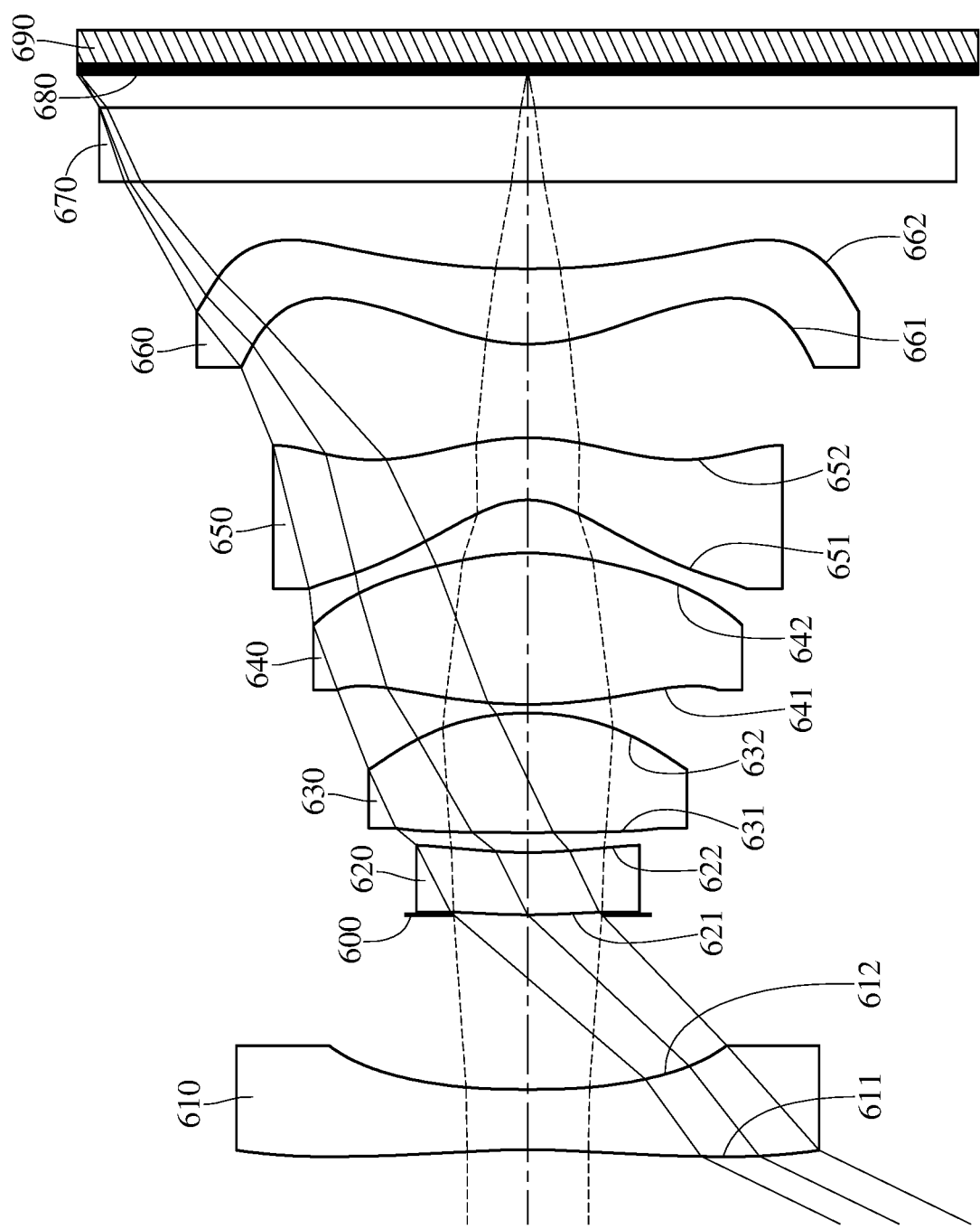
FIG. 11 is a schematic view of an image capturing unit according to the 6th embodiment of the present disclosure.
Figure 12:
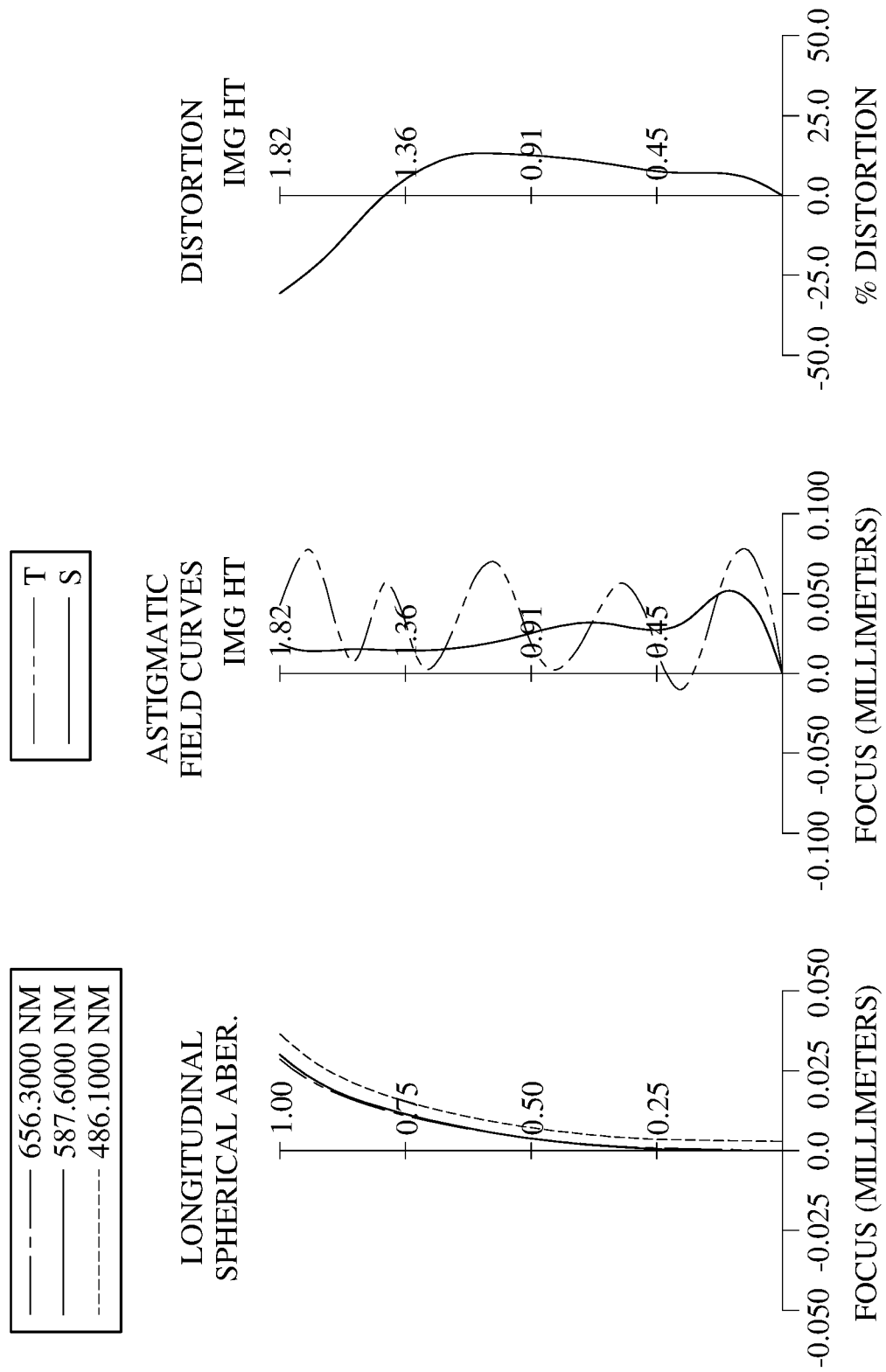
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the lens system (its reference numeral is omitted) of the present disclosure and an image sensor 690. The lens system includes, in order from an object side to an image side, a first lens element 610, an aperture stop 600, a second lens element 620, a third lens element 630, a fourth lens element 640, a fifth lens element 650, a sixth lens element 660, an IR-cut filter 670 and an image surface 680, wherein the lens system has a total of six non-cemented lens elements (610-660) with refractive power. There is an air gap in a paraxial region between every two of the first lens element 610, the second lens element 620, the third lens element 630, the fourth lens element 640, the fifth lens element 650 and the sixth lens element 660 that are adjacent to each other. In this embodiment, the first lens element 610 is an object-side lens element being the closest lens element to an imaged object among all lens elements with refractive power, and the sixth lens element 660 is an image-side lens element being the closest lens element to the image surface 680 among all lens elements with refractive power.

The first lens element 610 with negative refractive power has an object-side surface 611 being concave in a paraxial region thereof and an image-side surface 612 being concave in a paraxial region thereof. The first lens element 610 is made of plastic material and has the object-side surface 611 and the image-side surface 612 being both aspheric.

The second lens element 620 with negative refractive power has an object-side surface 621 being convex in a paraxial region thereof and an image-side surface 622 being concave in a paraxial region thereof. The second lens element 620 is made of plastic material and has the object-side surface 621 and the image-side surface 622 being both aspheric.

The third lens element 630 with positive refractive power has an object-side surface 631 being convex in a paraxial region thereof and an image-side surface 632 being convex in a paraxial region thereof. The third lens element 630 is made of plastic material and has the object-side surface 631 and the image-side surface 632 being both aspheric.

The fourth lens element 640 with positive refractive power has an object-side surface 641 being convex in a paraxial region thereof and an image-side surface 642 being convex in a paraxial region thereof. The fourth lens element 640 is made of plastic material and has the object-side surface 641 and the image-side surface 642 being both aspheric.

The fifth lens element 650 with negative refractive power has an object-side surface 651 being concave in a paraxial region thereof and an image-side surface 652 being convex in a paraxial region thereof. The fifth lens element 650 is made of plastic material and has the object-side surface 651 and the image-side surface 652 being both aspheric. The image-side surface 652 of the fifth lens element 650 has at least one concave shape in an off-axis region thereof.

The sixth lens element 660 with positive refractive power has an object-side surface 661 being convex in a paraxial region thereof and an image-side surface 662 being concave in a paraxial region thereof. The sixth lens element 660 is made of plastic material and has the object-side surface 661 and the image-side surface 662 being both aspheric. The image-side surface 662 of the sixth lens element 660 has at least one convex shape in an off-axis region thereof. The image-side surface 662 of the sixth lens element 660 has at least one inflection point in an off-axis region thereof.

The IR-cut filter 670 is made of glass and located between the sixth lens element 660 and the image surface 680, and will not affect the focal length of the lens system. The image sensor 690 is disposed on or near the image surface 680 of the lens system.

The detailed optical data of the 6th embodiment are shown in Table 11 and the aspheric surface data are shown in Table 12 below.

TABLE 11

6th Embodiment
f = 1.27 mm, Fno = 2.61, HFOV = 64.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −3.096 | (ASP) | 0.243 | plastic | 1.514 | 56.8 | −3.61 |
| 2 | | 4.757 | (ASP) | 0.703 | | | | |
| 3 | Ape. Stop | Plano | | 0.001 | | | | |
| 4 | Lens 2 | 2.733 | (ASP) | 0.251 | Plastic | 1.639 | 23.5 | −11.30 |
| 5 | | 1.912 | (ASP) | 0.080 | | | | |
| 6 | Lens 3 | 11.981 | (ASP) | 0.482 | Plastic | 1.544 | 55.9 | 1.87 |
| 7 | | −1.093 | (ASP) | 0.035 | | | | |
| 8 | Lens 4 | 1.789 | (ASP) | 0.610 | Plastic | 1.544 | 55.9 | 1.31 |
| 9 | | −1.039 | (ASP) | 0.214 | | | | |
| 10 | Lens 5 | −0.323 | (ASP) | 0.251 | Plastic | 1.639 | 23.5 | −0.92 |
| 11 | | −0.929 | (ASP) | 0.377 | | | | |
| 12 | Lens 6 | 0.712 | (ASP) | 0.304 | Plastic | 1.544 | 55.9 | 1.51 |
| 13 | | 4.484 | (ASP) | 0.350 | | | | |
| 14 | IR-cut filter | Plano | | 0.300 | Glass | 1.517 | 64.2 | — |
| 15 | | Plano | | 0.133 | | | | |
| 16 | Image | Plano | | — | | | | |

Note:
Reference wavelength is 587.6 nm (d-line).

TABLE 12

Aspheric Coefficients

| Surface # | 1 | 2 | 4 | 5 | 6 | 7 |
|---|---|---|---|---|---|---|
| k = | −1.0000E+00 | −1.1526E+00 | −3.0646E+00 | −4.5893E+01 | −1.0000E+00 | −8.0257E−01 |
| A4 = | 4.6865E−01 | 6.1028E−01 | −6.7556E−01 | −1.3024E−02 | −1.9315E−01 | −7.3780E−01 |
| A6 = | −8.7283E−01 | −1.6009E+00 | −9.4885E−01 | −2.1641E+00 | 3.0471E−01 | 3.2845E+00 |
| A8 = | 9.9566E−01 | 2.3910E+00 | 1.1943E+01 | 1.2806E+01 | 6.8472E+00 | −1.0731E+01 |
| A10 = | −6.3322E−01 | −1.1434E+00 | −8.7196E+01 | −3.4392E+01 | −2.0699E+01 | 1.7886E+01 |
| A12 = | 2.1027E−01 | — | — | 1.0134E+01 | 1.6489E+01 | −9.0259E+00 |
| A14 = | −2.8561E−02 | — | — | — | — | — |

| Surface # | 8 | 9 | 10 | 11 | 12 | 13 |
|---|---|---|---|---|---|---|
| k = | −3.0728E+01 | −9.4703E−01 | −2.2540E+00 | −1.8904E+00 | −1.7373E+01 | −3.2389E+00 |
| A4 = | 2.2829E−01 | 9.9629E−01 | 1.2316E+00 | 8.6212E−01 | 1.9364E+00 | 6.3275E−01 |
| A6 = | −4.9112E−01 | −2.7344E+00 | −2.7662E+00 | −5.0033E−01 | −1.0311E+01 | −3.1041E+00 |
| A8 = | −7.3597E−02 | 3.6892E+00 | 3.8483E+00 | 5.2698E−02 | 2.6273E+01 | 7.5352E+00 |
| A10 = | −5.9574E−02 | −2.7094E+00 | −3.0899E+00 | 4.4307E−02 | −3.8289E+01 | −9.9537E+00 |
| A12 = | — | 7.8760E−01 | 1.5342E+00 | −7.8459E−02 | 3.1810E+01 | 7.1465E+00 |
| A14 = | — | — | −5.7891E−01 | 3.1326E−02 | −1.4070E+01 | −2.6476E+00 |
| A16 = | — | — | — | — | 2.5677E+00 | 3.9638E−01 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 1.27 | TL/ImgH | 2.39 |
| Fno | 2.61 | TL/sin(1.6*HFOV) [mm] | 4.44 |
| HFOV [deg.] | 64.0 | f/R3 | 0.46 |
| tan(HFOV) | 2.05 | f/RL | 0.28 |
| Nmax | 1.639 | |f1/f2| | 0.32 |
| V2 + V5 | 47.0 | f3/f4 | 1.43 |
| SD/TD | 0.73 | (f/f3) + (f/f4) | 1.65 |
| T12/T45 | 3.29 | |SD11/SD62| | 0.88 |
| TL [mm] | 4.33 | f/EPD | 2.61 |

7th Embodiment

Figure 13:
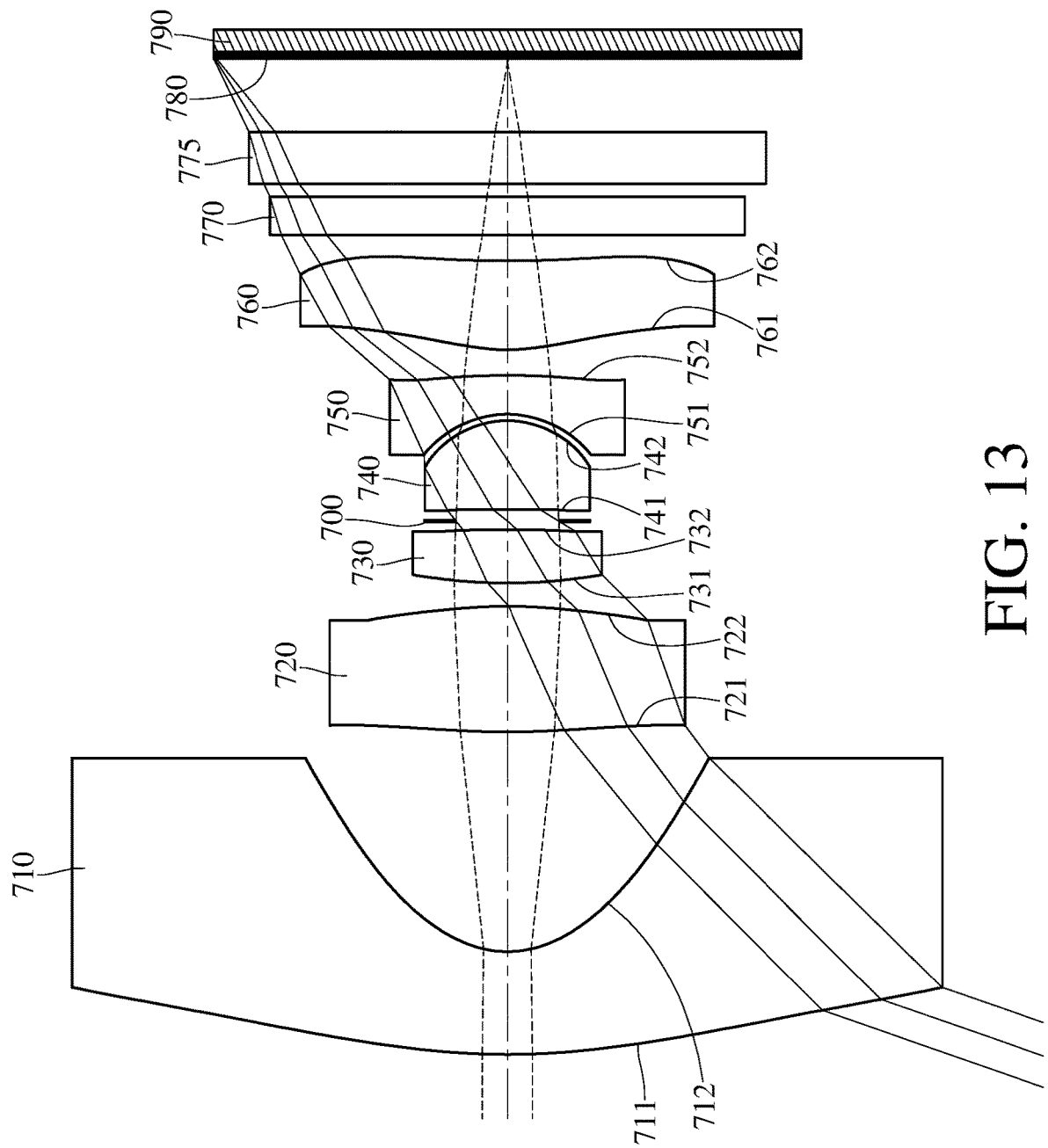
FIG. 13 is a schematic view of an image capturing unit according to the 7th embodiment of the present disclosure.
Figure 14:
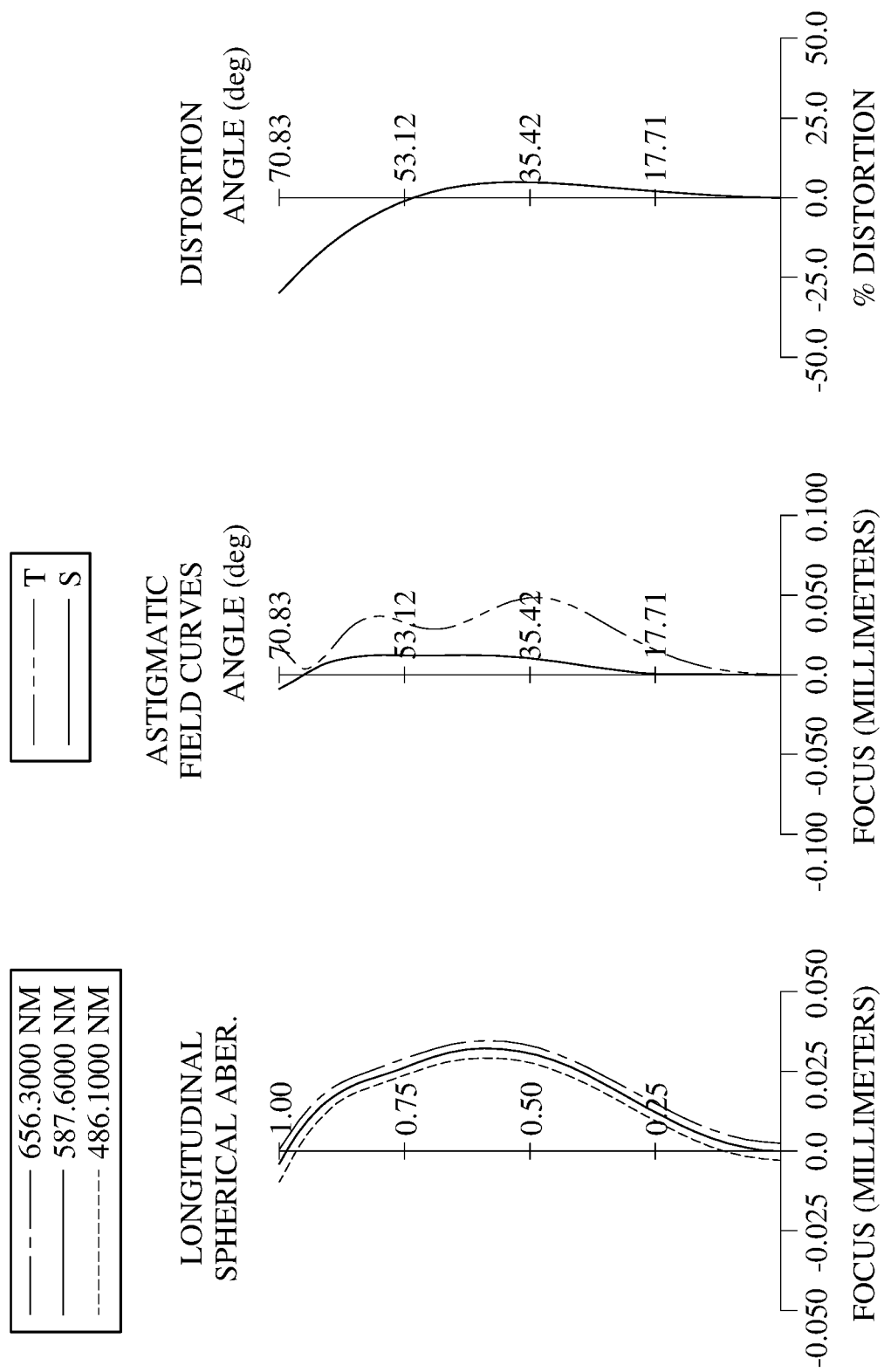
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the lens system (its reference numeral is omitted) of the present disclosure and an image sensor 790. The lens system includes, in order from an object side to an image side, a first lens element 710, a second lens element 720, a third lens element 730, an aperture stop 700, a fourth lens element 740, a fifth lens element 750, a sixth lens element 760, an IR-cut filter 770, a cover glass 775 and an image surface 780, wherein the lens system has a total of six non-cemented lens elements (710-760) with refractive power. There is an air gap in a paraxial region between every two of the first lens element 710, the second lens element 720, the third lens element 730, the fourth lens element 740, the fifth lens element 750 and the sixth lens element 760 that are adjacent to each other. In this embodiment, the first lens element 710 is an object-side lens element being the closest lens element to an imaged object among all lens elements with refractive power, and the sixth lens element 760 is an image-side lens element being the closest lens element to the image surface 780 among all lens elements with refractive power.

The first lens element 710 with negative refractive power has an object-side surface 711 being convex in a paraxial region thereof and an image-side surface 712 being concave in a paraxial region thereof. The first lens element 710 is made of plastic material and has the object-side surface 711 and the image-side surface 712 being both aspheric.

The second lens element 720 with positive refractive power has an object-side surface 721 being convex in a paraxial region thereof and an image-side surface 722 being convex in a paraxial region thereof. The second lens element 720 is made of plastic material and has the object-side surface 721 and the image-side surface 722 being both aspheric.

The third lens element 730 with positive refractive power has an object-side surface 731 being convex in a paraxial region thereof and an image-side surface 732 being convex in a paraxial region thereof. The third lens element 730 is made of plastic material and has the object-side surface 731 and the image-side surface 732 being both aspheric.

The fourth lens element 740 with positive refractive power has an object-side surface 741 being concave in a paraxial region thereof and an image-side surface 742 being convex in a paraxial region thereof. The fourth lens element 740 is made of plastic material and has the object-side surface 741 and the image-side surface 742 being both aspheric.

The fifth lens element 750 with negative refractive power has an object-side surface 751 being concave in a paraxial region thereof and an image-side surface 752 being convex in a paraxial region thereof. The fifth lens element 750 is made of plastic material and has the object-side surface 751 and the image-side surface 752 being both aspheric. The image-side surface 752 of the fifth lens element 750 has at least one concave shape in an off-axis region thereof.

The sixth lens element 760 with positive refractive power has an object-side surface 761 being convex in a paraxial region thereof and an image-side surface 762 being concave in a paraxial region thereof. The sixth lens element 760 is made of plastic material and has the object-side surface 761 and the image-side surface 762 being both aspheric. The image-side surface 762 of the sixth lens element 760 has at least one convex shape in an off-axis region thereof. The image-side surface 762 of the sixth lens element 760 has at least one inflection point in an off-axis region thereof.

The IR-cut filter 770 and the cover glass 775 are both made of glass and located between the sixth lens element 760 and the image surface 780, and will not affect the focal length of the lens system. The image sensor 790 is disposed on or near the image surface 780 of the lens system.

The detailed optical data of the 7th embodiment are shown in Table 13 and the aspheric surface data are shown in Table 14 below.

TABLE 13

7th Embodiment
f = 1.12 mm, Fno = 2.85, HFOV = 70.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 5.615 | (ASP) | 0.800 | Plastic | 1.544 | 55.9 | −1.87 |
| 2 | | 0.817 | (ASP) | 1.701 | | | | |
| 3 | Lens 2 | 6.513 | (ASP) | 0.976 | Plastic | 1.639 | 23.5 | 3.86 |
| 4 | | −3.732 | (ASP) | 0.181 | | | | |
| 5 | Lens 3 | 4.885 | (ASP) | 0.414 | Plastic | 1.544 | 55.9 | 6.08 |
| 6 | | −9.930 | (ASP) | 0.064 | | | | |
| 7 | Ape. Stop | Plano | | 0.091 | | | | |
| 8 | Lens 4 | −910.210 | (ASP) | 0.692 | Plastic | 1.544 | 55.9 | 1.27 |
| 9 | | −0.693 | (ASP) | 0.050 | | | | |
| 10 | Lens 5 | −0.731 | (ASP) | 0.300 | Plastic | 1.639 | 23.5 | −1.29 |
| 11 | | −7.259 | (ASP) | 0.200 | | | | |
| 12 | Lens 6 | 1.610 | (ASP) | 0.688 | Plastic | 1.544 | 55.9 | 3.28 |
| 13 | | 14.124 | (ASP) | 0.200 | | | | |
| 14 | IR-cut filter | Plano | | 0.300 | Glass | 1.517 | 64.2 | — |
| 15 | | Plano | | 0.100 | | | | |
| 16 | Cover glass | Plano | | 0.400 | Glass | 1.517 | 64.2 | — |
| 17 | | Plano | | 0.568 | | | | |
| 18 | Image | Plano | | — | | | | |

Note:
Reference wavelength is 587.6 nm (d-line).

TABLE 14

Aspheric Coefficients

| | Surface # | | | | | |
|---|---|---|---|---|---|---|
| | 1 | 2 | 3 | 4 | 5 | 6 |
| k = | −1.2497E+01 | −1.5308E+00 | −9.9000E+01 | −4.6436E+01 | 2.3840E+00 | −9.9000E+01 |
| A4 = | −1.5743E−03 | 1.1653E−01 | −3.7305E−03 | −3.4455E−03 | 1.1228E+00 | 7.1245E−03 |
| A6 = | 7.0097E−05 | −2.3029E−02 | −8.2538E−03 | 3.1833E−03 | −2.2848E−01 | −2.7917E−01 |
| A8 = | — | 1.0164E−03 | 5.5964E−03 | −5.2244E−03 | 1.2155E−01 | 5.5012E−01 |
| A10 = | — | — | −1.6835E−03 | — | — | — |

| | Surface # | | | | | |
|---|---|---|---|---|---|---|
| | 8 | 9 | 10 | 11 | 12 | 13 |
| k = | −4.8378E+01 | −1.4886E+00 | −5.8094E+00 | −1.0000E+00 | −1.7344E+00 | −9.9000E+01 |
| A4 = | −9.5593E−02 | 3.0420E−01 | −9.2912E−01 | −9.4608E−02 | −3.1240E−01 | 9.3959E−02 |
| A6 = | 5.3875E−01 | −4.2475E+00 | 2.5855E+00 | −1.4802E−01 | 3.4287E−01 | −2.0282E−01 |
| A8 = | −5.4335E+00 | 1.0014E+01 | −2.3637E+01 | 1.8340E+00 | −3.3751E−01 | 1.8442E−01 |
| A10 = | 3.3719E+00 | −1.1406E+01 | 1.2839E+02 | −4.2559E+00 | 2.5140E−01 | −1.0971E−01 |
| A12 = | — | — | −3.8805E+02 | 5.0183E+00 | −1.1648E−01 | 4.1245E−02 |
| A14 = | — | — | 6.1104E+02 | −3.0487E+00 | 2.8936E−02 | −8.6241E−03 |
| A16 = | — | — | −3.9454E+02 | 7.3584E−01 | −2.9648E−03 | 7.3432E−04 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 1.12 | TL/ImgH | 3.41 |
| Fno | 2.85 | TL/sin(1.6*HFOV) [mm] | 8.41 |
| HFOV [deg.] | 70.8 | f/R3 | 0.17 |
| tan(HFOV) | 2.87 | f/RL | 0.08 |
| Nmax | 1.639 | |f1/f2| | 0.48 |
| V2 + V5 | 47.0 | f3/f4 | 4.79 |
| SD/TD | 0.33 | (f/f3) + (f/f4) | 1.07 |
| T12/T45 | 34.02 | |SD11/SD62| | 2.11 |
| TL [mm] | 7.72 | f/EPD | 2.85 |

The foregoing image capturing unit is able to be installed in, but not limited to, an electronic device, including smart phones, tablet personal computers and wearable apparatuses. According to the present disclosure, the lens system has a total of six lens elements with refractive power. The first lens element has negative refractive, the second lens element has refractive power, the third lens element and the fourth lens element each have positive refractive power, the fifth lens element has negative refractive power, and the sixth lens element has refractive power. Therefore, the arrangement of the refractive powers is favorable for satisfying the requirements of large field of view and compact size simultaneously. When specific conditions are satisfied, it is favorable for assembling the lens element having stronger refractive power to a proper position so as to prevent the manufacturing tolerance of the lens element from influencing the manufacturing yield rate. Furthermore, it is favorable for preventing the refractive power of the second lens element from becoming too large. Moreover, it is favorable for reducing the incident angle of the light so as to avoid excessive aberration. According to the present disclosure, the lens system is applicable to the electronic device including at least three image capturing units so that the electronic device is for obtaining the composite image from the images captured by the image capturing units by post-processing (such as digital zoom post processing, depth of focus post processing or 3D image post processing) with the composite image having high resolution and good image quality.

The foregoing description, for the purpose of explanation, has been described with reference to specific embodiments. It is to be noted that TABLES 1-14 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An electronic device comprising three image capturing units, and the three image capturing units being:
   a first image capturing unit comprising a first lens system and a first image sensor, the first image sensor disposed on an image surface of the first lens system;
   a second image capturing unit comprising a second lens system and a second image sensor, the second image sensor disposed on an image surface of the second lens system; and
   a third image capturing unit comprising a third lens system and a third image sensor, the third image sensor disposed on an image surface of the third lens system;
   wherein the first image capturing unit, the second image capturing unit and the third image capturing unit face the same direction toward an imaged object, fields of view of the first lens system, the second lens system and the third lens system are different from one another, each of the first lens system, the second lens system and the third lens system comprises a plurality of lens elements being stationary relative to one another in the same image capturing unit, each of the first lens system, the second lens system and the third lens system is a single focus lens system;
   wherein the plurality of lens elements of the first lens system comprises six lens elements, and the six lens elements of the first lens system are, in order from an object side to an image side, a first lens element, a second lens element, a third lens element, a fourth lens element, a fifth lens element and a sixth lens element;
   wherein the first lens element has negative refractive power, the third lens element has positive refractive power, the fourth lens element has an object-side surface being convex in a paraxial region thereof, the fifth lens element has an image-side surface being convex in a paraxial region thereof, the sixth lens element has an image-side surface being concave in a paraxial region thereof, the image-side surface of the sixth lens element has at least one convex shape in an off-axis region thereof, and there is an air gap in a paraxial region between each of all adjacent lens elements of the six lens elements of the first lens system;
   wherein an axial distance between an object-side surface of the first lens element and the image surface of the first lens system is TL, half of a maximal field of view of the first lens system is HFOV, a maximum image height of the first lens system is ImgH, a focal length of the first lens system is f, a curvature radius of the image-side surface of the sixth lens element is RL, and the following conditions are satisfied:

$TL/\sin(HFOV*1.6)<10$ mm;

$1.30<\tan(HFOV)$;

$TL/ImgH<3.0$; and $0.4<f/RL<3.0$.

2. The electronic device of claim 1, wherein the electronic device performs a zoom function by using images captured by the first image capturing unit, the second image capturing unit and the third image capturing unit.

3. The electronic device of claim 1, wherein the object-side surface of the first lens element is concave in a paraxial region thereof, and the object-side surface of the first lens element has at least one convex shape in an off-axis region thereof.

4. The electronic device of claim 1, wherein the second lens element has an object-side surface being convex in a paraxial region thereof and an image-side surface being concave in a paraxial region thereof, and at least three of the six lens elements of the first lens system are made of plastic material.

5. The electronic device of claim 1, wherein the focal length of the first lens system is f, a focal length of the third lens element is f3, a focal length of the fourth lens element is f4, and the following condition is satisfied:

$0.80<(f/f3)+(f/f4).$

6. The electronic device of claim 1, wherein a maximum refractive index among the plurality of lens elements of the first lens system is Nmax, the focal length of the first lens system is f, an entrance pupil diameter of the first lens system is EPD, and the following conditions are satisfied:

$1.60<Nmax<1.70;$ and $f/EPD<2.65.$

7. The electronic device of claim 1, wherein there is a maximum effective radius of the object-side surface of the first lens element is SD11, a maximum effective radius of the image-side surface of the sixth lens element is SD62, and the following condition is satisfied:

$|SD11/SD62|<1.25.$

8. The electronic device of claim 1, wherein the axial distance between the object-side surface of the first lens element and the image surface of the first lens system is TL, half of the maximal field of view of the first lens system is HFOV, and the following condition is satisfied:

$TL/\sin(HFOV*1.6)<7.0$ mm.

9. The electronic device of claim 1, wherein the focal length of the first lens system is f, an entrance pupil diameter of the first lens system is EPD, and the following condition is satisfied:

$f/EPD \le 2.45.$

10. The electronic device of claim 9, wherein the focal length of the first lens system is f, the entrance pupil diameter of the first lens system is EPD, and the following condition is satisfied:

$f/EPD \le 2.29.$

11. The electronic device of claim 1, wherein the axial distance between the object-side surface of the first lens element and the image surface of the first lens system is TL, and the following condition is satisfied:

$TL<5.0$ mm.

12. The electronic device of claim 1, wherein the first lens system further comprises an aperture stop, an axial distance between the aperture stop and the image-side surface of the sixth lens element is SD, an axial distance between the object-side surface of the first lens element and the image-side surface of the sixth lens element is TD, and the following condition is satisfied:

$0.65<SD/TD<0.90.$

13. The electronic device of claim 1, wherein a focal length of the first lens element is f1, a focal length of the second lens element is f2, and the following condition is satisfied:

$|f1/f2|<1.20.$

14. The electronic device of claim 1, wherein the focal length of the first lens system is f, a curvature radius of an object-side surface of the second lens element is R3, and the following condition is satisfied:

$0.25<f/R3.$

15. The electronic device of claim 1, wherein a focal length of the third lens element is f3, a focal length of the fourth lens element is f4, and the following condition is satisfied:

$0<f3/f4<3.0.$

16. The electronic device of claim 1, wherein an Abbe number of the second lens element is V2, an Abbe number of the fifth lens element is V5, and the following condition is satisfied:

$V2+V5<60.$

17. The electronic device of claim 1, wherein an axial distance between the first lens element and the second lens element is T12, an axial distance between the fourth lens element and the fifth lens element is T45, and the following condition is satisfied:

$2.0<T12/T45.$

18. The electronic device of claim 1, wherein the axial distance between the object-side surface of the first lens element and the image surface of the first lens system is TL, the maximum image height of the first lens system is ImgH, and the following condition is satisfied:

$TL/ImgH<2.50.$

19. The electronic device of claim 1, wherein the sixth lens element has an object-side surface being convex in a paraxial region thereof.

20. The electronic device of claim 1, wherein the first lens system is applied to a moving focus optical system.

21. The electronic device of claim 1, wherein the electronic device is a phone, and the electronic device further comprises a display unit, a control unit, a storage unit, a random access memory unit (RAM), and a read only memory unit (ROM).

22. The electronic device of claim 21, wherein the first image capturing unit, the second image capturing unit and the third image capturing unit are arranged horizontally.

23. The electronic device of claim 21, wherein the first image capturing unit, the second image capturing unit and the third image capturing unit are arranged vertically.

24. The electronic device of claim 21, wherein the first image capturing unit, the second image capturing unit and the third image capturing unit are arranged in a triangular arrangement.

* * * * *